(12) United States Patent
Yamaki et al.

(10) Patent No.: US 8,366,146 B2
(45) Date of Patent: Feb. 5, 2013

(54) VEHICLE SEAT

(75) Inventors: Jogen Yamaki, Utsunomiya (JP);
Takeshi Abe, Utsunomiya (JP); Hisato Oku, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/258,742

(22) PCT Filed: Mar. 23, 2010

(86) PCT No.: PCT/JP2010/002032
§ 371 (c)(1),
(2), (4) Date: Sep. 22, 2011

(87) PCT Pub. No.: WO2010/109845
PCT Pub. Date: Sep. 30, 2010

(65) Prior Publication Data
US 2012/0013108 A1    Jan. 19, 2012

(30) Foreign Application Priority Data

Mar. 24, 2009 (JP) ................... 2009-071798
Mar. 24, 2009 (JP) ................... 2009-071799
Mar. 25, 2009 (JP) ................... 2009-074140

(51) Int. Cl.
*B60N 2/42* (2006.01)
*B60R 21/207* (2006.01)
(52) U.S. Cl. ............ 280/730.2; 297/216.13; 297/452.18
(58) Field of Classification Search ............... 280/730.2; 297/216.13, 452.18
See application file for complete search history.

(56) References Cited

U.S. PATENT DOCUMENTS

| | | | | |
|---|---|---|---|---|
| 4,249,769 A * | 2/1981 | Barecki | ........................ | 296/68.1 |
| 4,512,604 A * | 4/1985 | Maeda et al. | ................. | 296/68.1 |
| 6,299,238 B1 * | 10/2001 | Takagi et al. | ............ | 296/187.12 |
| 6,299,239 B1 * | 10/2001 | Sagawa et al. | ........... | 296/187.12 |
| 7,284,800 B2 * | 10/2007 | Ishizuka | .................. | 297/452.18 |

(Continued)

FOREIGN PATENT DOCUMENTS

| | | |
|---|---|---|
| EP | 2022664 | 2/2009 |
| JP | 07-266953 | 10/1995 |

(Continued)

OTHER PUBLICATIONS

International Search Report, Application No. PCT/JP2010/002032 dated Jun. 22, 2010, two pages.

(Continued)

*Primary Examiner* — Drew Brown
(74) *Attorney, Agent, or Firm* — Rankin, Hill & Clark LLP

(57) ABSTRACT

A vehicle seat includes: a seatback frame including an outer side part frame, provided at an outer side in a width direction of a vehicle body, and an inner side part frame, provided at an inner side in the width direction; an outer side load transmission block protruding from the seatback frame towards an outer side in the width direction, and transmitting to the seatback frame, an impact load inputted from a side of the vehicle body; and a protrusion part protruding from a side surface of the outer side part frame towards an outer side in the width direction, wherein the protrusion part is fitted and fixed to a fitting hole provided on the outer side load transmission block.

9 Claims, 14 Drawing Sheets

U.S. PATENT DOCUMENTS

| | | | |
|---|---|---|---|
| 7,946,614 B2 * | 5/2011 | Breuninger et al. | 280/730.2 |
| 8,033,602 B2 * | 10/2011 | Yamaki et al. | 297/216.13 |
| 2005/0264053 A1 * | 12/2005 | Saberan et al. | 297/216.13 |
| 2009/0021061 A1 * | 1/2009 | Yamaki et al. | 297/216.13 |

FOREIGN PATENT DOCUMENTS

| | | |
|---|---|---|
| JP | 08-156668 | 6/1996 |
| JP | 9-188215 | 7/1997 |
| JP | 2001-149176 | 6/2001 |
| JP | 2004-016708 | 1/2004 |
| JP | 2005-153839 | 6/2005 |
| JP | 2007-326441 | 12/2007 |
| JP | 2009-006894 | 1/2009 |
| JP | 2009-046112 | 3/2009 |

OTHER PUBLICATIONS

Notice of Allowance, JP Application No. 2009-071798, Mar. 8, 2011, six pages.

Office Action, JP Application No. 2009-074140, Jun. 15, 2010, four pages.

* cited by examiner

VEHICLE SEAT

TECHNICAL FIELD

The present invention relates to a vehicle seat transmitting an impact load inputted from a side direction of a vehicle to an area at an inner side in a width direction of a vehicle body.

The present application claims priority from Japanese Patent Application No. 2009-071798, filed Mar. 24, 2009; Japanese Patent Application No. 2009-071799, filed Mar. 24, 2009; and Japanese Patent Application No. 2009-074140, filed Mar. 25, 2009; the contents of which are incorporated herein by reference.

BACKGROUND ART

A technology is known, which transmits an impact load, entered from a side direction of a vehicle at a time of collision, to a vehicle body floor via a seat. (See, for example, Patent Document 1).

According to a vehicle seat disclosed in Patent Document 1, a reinforcing member is installed on a back side of an upper frame of a seatback frame. The reinforcing member is elongated beyond a seatback width towards an outer side in the vehicle width direction. As a result, an impact load inputted from a side part of a vehicle body is transmitted to a seatback frame through the reinforcing material. Further, according to this vehicle seat, an airbag unit is supported by an area of the reinforcing material extending towards an outer side in the vehicle width direction. As a result, a reactive force, occurring at the time when an airbag deploys, is received by the reinforcing material.

PRIOR ART DOCUMENT

Patent Document

[Patent Document 1] Japanese Unexamined Patent Application, First Publication No. H8-156668

DISCLOSURE OF INVENTION

Problems to be Solved by the Invention

However, according to this conventional vehicle seat, the reinforcing member, which receives an impact load from a side part of the vehicle body, is placed so as to be offset at a back side of the seatback frame. Therefore, the efficiency with which the impact load is transmitted with respect to the seatback frame is not sufficiently high. In order to effectively utilize the robustness of the seatback frame itself, a further improvement of the efficiency with which the impact load is transmitted is desired.

Further, in the case of a conventional vehicle seat, an airbag unit is attached to an area of the reinforcing material protruding towards an outer side from the seatback frame. As a result, the airbag unit cannot be installed unless many auxiliary components are added. In this way, since the number of components increases, the installation procedure of the airbag unit becomes cumbersome.

Therefore, an object of the present invention is to provide a vehicle seat which can simplify the structure of the vehicle seat, simplify the installation procedure of the vehicle seat, enhance the efficiency with which a load is transmitted from a side of the vehicle body to the seatback frame, and quickly transmit an impact load at the time of a side collision towards an inner side in the width direction using a wide area of the seat.

Means for Solving the Problems (1) A vehicle seat according to a first embodiment of the present invention includes a seatback frame including an outer side part frame, provided at an outer side in a width direction of a vehicle body, and an inner side part frame, provided at an inner side in the width direction; an outer side load transmission block protruding from the seatback frame towards an outer side in the width direction, and transmitting to the seatback frame, an impact load inputted from a side of the vehicle body; and a protrusion part protruding from a side surface of the outer side part frame towards an outer side in the width direction, wherein the protrusion part is fitted and fixed to a fitting hole provided on the outer side load transmission block.

(2) The vehicle seat may be configured as follows: the outer side part frame comprises a side wall fixing the outer side load transmission block to an outer side surface, and an outer side rear wall bending from a rear end of the side wall towards an inner side in the width direction; the inner side part frame comprises an inner side rear wall bent towards an outer side in the width direction; a reinforcing member is bridged between the outer side rear wall and the inner side rear wall; and the reinforcing member is connected to a rear surface of the outer side part frame and a rear surface of the inner side part frame.

(3) The vehicle seat may be configured as follows: the vehicle seat further includes a cross member connecting the outer side part frame and the inner side part frame at approximately a same height as the outer side load transmission block, wherein the cross member comprises a front panel and a rear panel; and an end part of the cross member is connected to the outer side part frame so that, an end part of the front panel at an outer side in the width direction is positioned at a frontal side of the outer side load transmission block, and so that an end part of the rear panel at an outer side in the width direction is positioned at a rear side of the outer side load transmission block.

(4) The vehicle seat may be configured as follows: the vehicle seat further includes an airbag unit; and a base member fixing the outer side load transmission block and the airbag unit, wherein the base member comprises a penetration hole, the protrusion part being penetrated and fitted to the penetration hole; and the base member is fixed to a side surface of the seatback frame at an outer side in the width direction while the protrusion part being fitted to the penetration hole.

(5) The vehicle seat may be configured as follows: the base member is planar, and the outer side load transmission block and the airbag unit are fixed to a surface of the base member.

Effects of the Invention

According to the configuration described in (1), the outer side load transmission block is fixed to a side surface of the side frame in a condition in which a fitting hole is fitted to a protrusion part. When a side collision of a vehicle occurs, and an impact load is inputted to the outer side load transmission block, the impact load is transmitted edge-on to a side frame at an outer side in a width direction of the seatback frame via the protrusion part.

In this way, a fitting hole of the outer side load transmission block is fitted to a protrusion part provided at a side surface of the side frame at an outer side in the width direction. Under this condition, the outer side load transmission block is fixed to the side frame. As a result, when a side collision occurs, the impact load inputted to the outer side load transmission block can be received edge-on by the side frame at an outer side in the width direction. As a result, it is possible to enhance the efficiency with which the load is transmitted from the side of the vehicle body to the seatback frame.

Further, according to the configuration described in (2), at the time of a side collision of a vehicle, when an impact load is entered from the outer side load transmission block to a side frame at an outer side in the width direction, the load is transmitted to a side frame at an inner side in the width direction via a reinforcing member and via an upper and lower backbone part of the seatback frame. Further, the outer side load transmission block is attached to the side frame at an outer side in the width direction from an outer side in the width direction. The reinforcing member is attached to the side frame at both sides of the width direction from the front-rear direction.

In this way, both rear walls of the side frames at both sides of the width direction are connected with the reinforcing member. As a result, the impact load inputted to the outer side load transmission block at the time of a side collision may be transmitted towards the inner side in the vehicle width direction in a more efficient manner. Furthermore, the load transmission block may be attached to the side frame from an outer side in the vehicle width direction. Furthermore, the reinforcing member may be attached to the side frames at both sides from the front-rear direction. As a result, the operability of the installment operation during the manufacturing process may be enhanced.

In addition, according to the configuration described in (3), at the time of a side collision of a vehicle, when an impact load is entered to the outer side load transmission block from a side part of the vehicle body, the load is transmitted edge-on to a side frame at an outer side in the width direction, and is further transmitted from the side frame to a side frame at an inner side in the width direction, via a cross member and via an upper and lower backbone part of the seatback frame. Further, an end part of the cross member at an outer side in the width direction is connected to a side frame at an outer side in the width direction so that a closed cross section bridges a front side of the outer side load transmission block and a rear side of the outer side load transmission block. As a result, the load is transmitted from the outer side load transmission block to an end part of the cross member in a linear manner.

In this way, the outer side load transmission block is fixed to an outer side surface of a side frame at an outer side in the width direction. Further, an end part of the cross member at an outer side in the width direction is connected to a side frame at an outer side in the width direction so that a closed cross section of the end part bridges a front side of the outer side load transmission block and a rear side of the outer side load transmission block. As a result, the impact load at the time of a side collision may be transmitted edge-on from the outer side load transmission block to a side frame at an outer side in the width direction. At the same time, the load may be applied in a linear manner at a central part of the closed cross section of the end part of the cross member. Therefore, it is possible to enhance the efficiency with which the load is transmitted from the side of the vehicle body to the seatback frame. Further, it is possible to quickly transmit the impact load at the time of a side collision to an inner side in the width direction of the seatback frame.

Further, according to the configuration described in (4), an airbag unit and the outer side load transmission block are fixed to a side surface of the seatback frame at an outer side in the width direction, via a base member.

As a result, the outer side load transmission block and an airbag unit are fixed to a side surface of the seatback frame at an outer side in the width direction, via a common base member. Thus, outer side load transmission block and the airbag unit may be easily installed to the seatback frame with a simple configuration with a small number of components. In addition, it is possible to efficiently transmit the impact load, inputted to the outer side load transmission block, to a side surface of the seatback frame at an outer side in the width direction.

Furthermore, a penetration hole of a base member is fitted to a protrusion part protruding from the seatback frame towards an outer side in the width direction in a penetrating condition. As a result, the base member may be positioned to the seatback frame. Consequently, it is possible to enhance the accuracy with which the load transmission block and the airbag unit are attached to the seatback frame.

Further, according to the configuration described in (5), the base member includes a planar component. The outer side load transmission block and the airbag unit are fixed to one surface of the planar component. As a result, the space occupied by the base member in the seat width direction is reduced. Thus, the side part of the seat may be effectively utilized.

EMBODIMENTS FOR CARRYING OUT THE INVENTION

Hereinafter, a vehicle seat according to a first embodiment of the present invention is described according to FIGS. 1 to 3. A concrete description of the above embodiment is provided in order to facilitate an understanding of a gist of the present invention. The following description does not limit the present invention, unless specifically noted.

Figure 1:
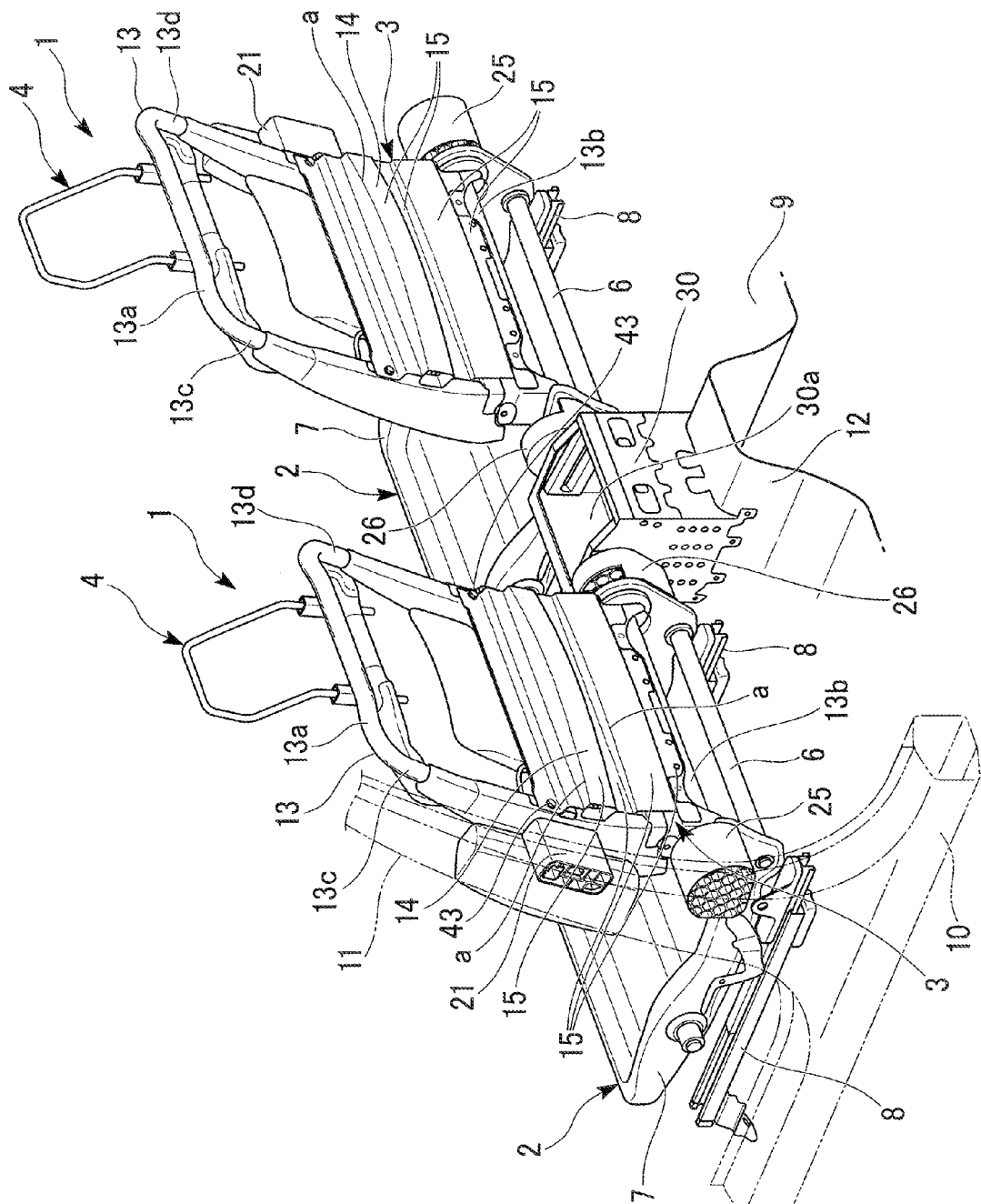
FIG. 1 is a perspective view of a vehicle seat according to a first embodiment of the present invention.
Figure 2:
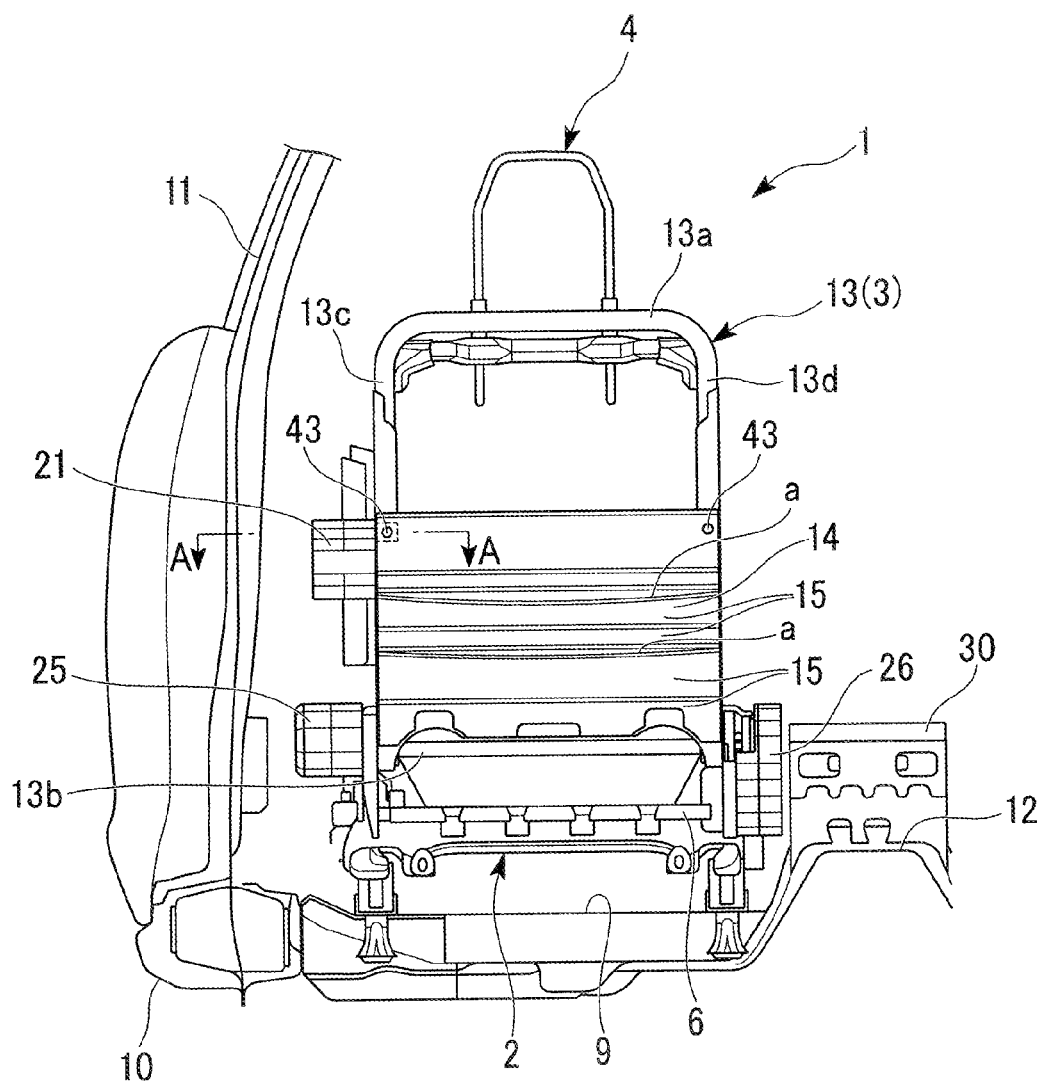
FIG. 2 is a back side view of a vehicle seat according to the above embodiment.

FIGS. 1 and 2 are respectively a perspective view and a back side view of a vehicle seat 1 according to the present invention. The vehicle seat 1 is provided at a front seat side of the vehicle. FIGS. 1 and 2 are diagrams viewing the vehicle seat 1 from a diagonally rear side. Incidentally, in the diagram, only a skeletal component of the vehicle seat 1 is shown.

The vehicle seat 1 includes a seat cushion 2 which supports a bottom of a passenger, a seatback 3 which is linked to a rear end part of the seat cushion 2 and supports a hip and a chest (a back) of the passenger, and a head rest 4 which is supported by an upper part of the seatback 3 and supports a head and a neck of the passenger.

The vehicle seat 1 includes a seat cushion 2 which supports a bottom of a passenger, a seatback 3 which is linked to a rear end part of the seat cushion 2 and supports a hip and a chest (a back) of the passenger, and a head rest 4 which is supported by an upper part of the seatback 3 and supports a head and a neck of the passenger.

The seat cushion 2 includes a cushion frame 7 at a rear end part of the seat cushion 2. A rear part cross member 6 is fastened to the cushion frame. The rear part cross member 6 extends along the vehicle width direction. This cushion frame 7 is provided on a vehicle body floor 9 via a seat rail 8, 8 so that the cushion frame 7 can slide in the front-rear direction. Incidentally, reference numeral 10 in the diagram indicates a side sill provided on a lower end side part of the vehicle body. Reference numeral 11 indicates a center pillar which is provided at approximately a center of a side part of the vehicle body. Reference numeral 12 is a floor tunnel formed so as to expand upwards at a central region in a vehicle width direction on the vehicle body floor 9. A console box 30 is fixed between the left vehicle seat 1 and the right vehicle seat 1 in a front row on the floor tunnel 12. A storage part 30a is provided at an upper surface side of the console box 30.

The seatback 3 includes a seatback frame 13 which is shaped approximately like a rectangular frame. The seatback frame 13 includes an upper frame 13a, a left side frame 13c, a right side frame 13d, and a lower connecting plate 13b. A lower end of the seatback frame 13 is hinge-connected to a rear end part of the cushion frame so that the seatback frame 13 can tilt. A supporting frame of the head rest 4 is provided at a central location in the width direction of the upper part frame 13a of the seatback frame 13, so that the supporting frame of the head rest 4 can be elevated and lowered.

A plate member 14 is provided on a back side of the seatback frame 13. The plate member 14 is approximately rectangular as seen from a frontal view.

The plate member 14 includes a plurality of concave and convex parts 15. A ridge part a of the concave and convex parts 15 extends in the vehicle width direction. A wave-shaped cross section, formed by the concave and convex parts 15, extends continuously in the longitudinal direction of the vehicle body. A left side rim and a right side rim of the plate member 14 are connected to both the left side frame 13c and the right side frame 13d. The height of an upper end part of the plate member 14 is set to be approximately equal to the height of the chest of the passenger sitting on the vehicle seat.

Figure 3:
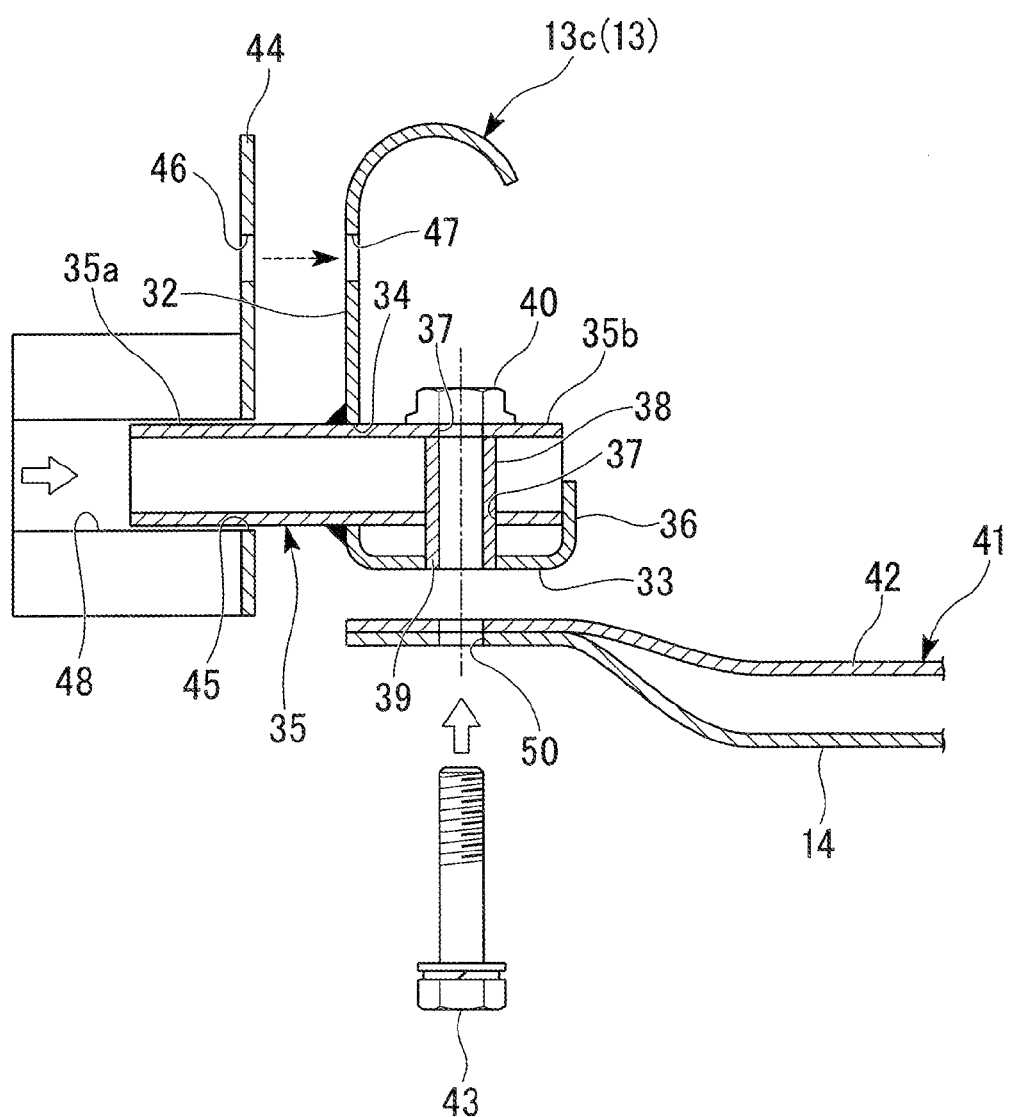
FIG. 3 is a broken down cross sectional view of a vehicle seat according to the above embodiment corresponding to a cross section A-A in FIG. 2.

FIG. 3 shows a broken down cross section near a connecting part between the plate member 14 and the side frame 13c at an outer side in the vehicle width direction.

As shown in FIG. 3, the side frame 13c is a component having a cross section which is approximately L-shaped. The side frame 13c includes a side wall 32 and a rear wall 33. The side wall 32 is positioned at an outer side in the vehicle width direction. The rear wall 33 extends from a rear end part of the side wall 32 towards the inner side in the vehicle width direction. Further, a penetration hole 34 is provided at a side wall 32 of the side frame 13c. An extension frame 35, which is pipe-shaped, is welded to the side wall 32 in a condition in which the extension frame 35 is fitted to the penetration hole 34.

The extension frame 35 extends along the width direction of the seat. An end side protrudes for a predetermined length from the side wall 32 of the side frame 13c towards an outer side in the width direction. At the same time, the other end side of the extension frame 35 protrudes from the side wall 32 of the side frame 13c towards the inner side in the width direction. Hereinafter, an area protruding from the side wall 32 of the side frame 13c towards an outer side in the width direction is referred to as an "outer side protrusion part 35a." Furthermore, an area protruding from the side wall 32 of the side frame 13c towards an inner side in the width direction is referred to as an "inner side protrusion part 35b."

A load transmission block 21 is fitted and fixed to the outer side protrusion part 35a of the extension frame 35 from an outer side in the width direction. The load transmission block transmits an impact load, inputted from a side of the vehicle body, to the seatback frame 13. This load transmission block 21 is described later.

Meanwhile, an end surface of the inner side protrusion part 35b of the extension frame 35 contacts a flange part 36. The flange part 36 is formed so as to bend in an approximately perpendicular manner towards a frontal side from an end part at an inner side in the width direction of the rear wall 33 of the side frame 13c. Further, a penetration hole 37 is formed on the inner side protrusion part 35b. The penetration hole 37 is formed along a direction perpendicular to an axis. At the same time, a collar 38 is fixed to the inner side protrusion part 35b so that the collar 38 is provided along the penetration hole 37. An end part of the collar 38 protrudes outside from an exterior peripheral surface of the inner side protrusion part 35b. This protruding end part is fixed to a penetration hole 39 formed on the rear wall 33 of the side frame 13c. Further, a weld nut 40 is provided on a rim part of a penetration hole 37 at a side at which the collar 38 of the inner side protrusion part 35b does not protrude.

Incidentally, although a detailed diagram is omitted, the cross section of the side frame 13d at an inner side in the width direction is L-shaped, similar to the side frame 13c at an outer side in the width direction. The side frame 13d includes a side wall and a rear wall. Further, a penetration hole and a weld nut are provided at a rear wall of the side frame 13d.

Incidentally, the cross section of the plate material 14 is wave-shaped and has a plurality of concaved and convex parts 15, as described earlier. However, a back side plate material 42 is adhered to a back side of the plate material 14 (at a front side of the vehicle in a condition attached to the seatback frame 13). The back side plate material 42 is included in the reinforcing member 41, along with the plate material 14. The reinforcing material 41 is configured so that the upper and lower edge parts and the left and right edge parts of both the plate material 14 and the back side plate material 42 are welded to each other. A closed cross sectional structure is provided at its inner side region.

Both rim parts of the reinforcing member 41 are overlapped against a rear surface of the rear wall 33 of the side frames 13c, 13d. In this condition, both rim parts of the reinforcing member 41 are connected to the side frames 13c, 13d with a bolt 43. At this time, at a side frame 13c side at an outer side in the width direction, the bolt 43 is inserted to the collar 38. The bolt 43 is then fastened to the weld nut 40 provided on the extension frame 35. Further, at the side frame 13d at the inner side in the width direction, the bolt 43 is fastened to a weld nut provided at a rear wall of the side frame 13d. Incidentally, the reference numeral 50 in FIG. 3 indicates a bolt insertion hole at a rim part of the reinforcing member 41.

Here, the load transmission block 21 is formed as a honeycomb structure including a plurality of cylindrical parts extending along the vehicle width direction and positioned in parallel. Overall, the load transmission block 21 includes resin, and is shaped as a parallelepiped elongated in the longitudinal direction. This load transmission block 21 is attached to a base plate 44 including a metal plate which is approximately rectangular. The other surface of the base plate is overlapped and welded to an outer side surface of the side wall 32 of the side frame 13c. However, a penetrating hole 45 is formed on the base plate 44. The penetration hole 45 is fitted with an outer side protrusion part 35a of the extension frame 35 protruding from the side frame 13c. At the same time, a bolt insertion hole 46 is provided on the base plate 44. A bolt is inserted to this bolt insertion hole 46. This bolt is not diagrammed. This bolt is inserted to the bolt insertion hole 46 in order to connect the base plate 44 to the side frame 13c. Incidentally, the reference numeral 47 in FIG. 3 indicates a bolt insertion hole provided on the side wall 32. Further, a fitting hole 48 is formed on the load transmission block 21. The fitting hole 48 is fitted with an outer side protrusion part 35a protruding from the penetration hole 45 of the base plate 44.

Incidentally, a guiding protrusion (not diagrammed) is provided in the longitudinal positions of the penetration hole 45 on the base plate 44. The guiding protrusion is shaped as a rectangular cylinder. A fitting hole (not diagrammed) is formed on the load transmission block 21. These guiding protrusions are fitted into this fitting hole.

The lower edge parts of the left side frame 13c and the right side frame 13d, shown in FIG. 1 and FIG. 2, are connected together with a lower cross member (not diagrammed). The lower cross member surrounds a hinge shaft which rotatably links the seat cushion 2 and a seatback 3. The load transmission block 25 is provided on an external side surface of the side frame 13c in the vehicle width direction positioned along an extension of the lower cross member. The load transmission block 26 is provided on an inner side surface of the side frame 13d in the vehicle width direction. Similar to the load transmission block 21, each of the load transmission blocks 25, 26 is formed as a honeycomb structure including a plurality of cylindrical parts extending along the vehicle width direction and positioned in parallel. Further, the load transmission block 26 placed toward the side frame 13d faces the side wall of the console box 30 at a central portion in the vehicle width direction.

According to the configuration described above, when an impact load is entered from a side of the vehicle, and a side wall of the vehicle body such as a center pillar 11 and the like deforms in the direction of the seatback 3, the load from the side wall is transmitted to the side frame 13c via at least one of the upper and lower load transmission blocks 21, 25.

When an impact load is entered to the lower impact transmission block 25, the entire seat moves towards the inner side in the vehicle width direction. At the same time, the impact transmission block 26, provided at the inner lower side in the vehicle width direction, comes in contact with the console box 30. At this time, the load is transmitted from the lower cross member, positioned below the seatback frame 13, to the floor tunnel 12 via the load transmission block 26 and via the console box 30.

Furthermore, when an impact load is entered to the upper load transmission block 21, the load is transmitted from the load transmission block 21 to the side frame 13c via the base plate 44 and the extension frame 35. The load is then transmitted to the side frame 13d at the inner side in the vehicle width direction, via the reinforcing member 41 connected to a rear surface side of the side frame 13c and via an upper and lower framework of the seatback frame 13 (i.e., the upper frame 13a and the lower connecting plate 13b). At this time, when an impact load enters from the side frame 13c to an upper end part of the reinforcing member 41, a stress is created in the shear direction at a plurality of regions divided by the ridge part a of each of the concaved and convex parts 15 of the plate member 14. Thus, the impact load which was entered is received by roughly the entire plate member 14. In particular, according to the first embodiment, the back surface plate material 42 is further connected to the plate material 14. Moreover, the reinforcing member 41 is a closed-cross sectional structure. As a result, the load which is entered is transmitted to the side frame 13d at an inner side in the width direction by a reinforcing member 41 having high rigidity.

In this way, as the impact load is transmitted so as to be scattered to the entire seatback frame 13, the entire seat moves towards the inner side in the vehicle width direction. At the same time, the load transmission block 26 comes in contact with the console box 30. The load is thus transmitted from the load transmission block 26 to the floor tunnel 12 via the console box 30.

According to the vehicle seat 1 as described above, the outer side protrusion part 35a of the extension frame 35 is provided on the side wall 32 of the side frame 13c at an outer side in the width direction. The load transmission block 21 is fixed to the side frame 13c in a condition such that the load transmission block 21 is fitted to the outer side protrusion part 35a. Therefore, at the time of a side collision of the vehicle, the impact load inputted to the load transmission block 21 at an upper portion may be received edge-on by the side frame 13c at an outer side in the width direction. Therefore, the impact load, inputted from the load transmission block 21, may be transmitted from the side frame 13c to another side frame 13d by effectively utilizing the upper and lower framework of the seatback frame 13 (i.e., the upper frame 13a and the lower connecting plate 13b). Therefore, according to the vehicle sheet 1 based on the present embodiment, there is an increase in the efficiency with which the load is transmitted from the side of the vehicle body to the seatback frame 13. Further, at the time of a side collision of the vehicle, the load may be transmitted quickly to the floor tunnel 21 side.

In addition, according to the vehicle seat 1 based on the present embodiment, the left side frame 13c and the right side frame 13d are configured so that the cross sections are shaped like the letter L. Further, the left side frame 13c and the right side frame 13d include a side wall 32 and a rear wall 33. Moreover, the reinforcing member 41 connects the rear walls 33 of both of the side frames 13c, 13d. As a result, the load may be transmitted in an efficient manner to the side frame 13d at an inner side in the vehicle width direction using both the reinforcing material 41 and the upper and lower framework of the seatback frame 13.

Here, when the load transmission block 21 and the reinforcing member 41 are installed to the seatback frame 13, as shown in FIG. 3, the load transmission block 21 may be attached to the side surface of the side frame 13c from the outer side in the width direction by a fitting between the extension frame 35 and the fitting hole 48 and by a bolt fastening of the base plate 44. By fastening with the bolt 43, the reinforcing member 41 may be attached to the rear surface of the side frames 13c, 13d from the front-rear direction. Therefore, according to the vehicle seat 1 based on the above embodiment, an assembly may be made easily at the time of manufacturing. Further, the installation procedure of the load transmission block 21 and the installation procedure of the reinforcing member 41 may be performed in parallel, or, alternatively, the procedures may be performed by wrapping up a part of the procedures.

Hereinafter, a vehicle sheet according to a second aspect of the present invention is described with reference to FIGS. 4 to 8.

Figure 4:
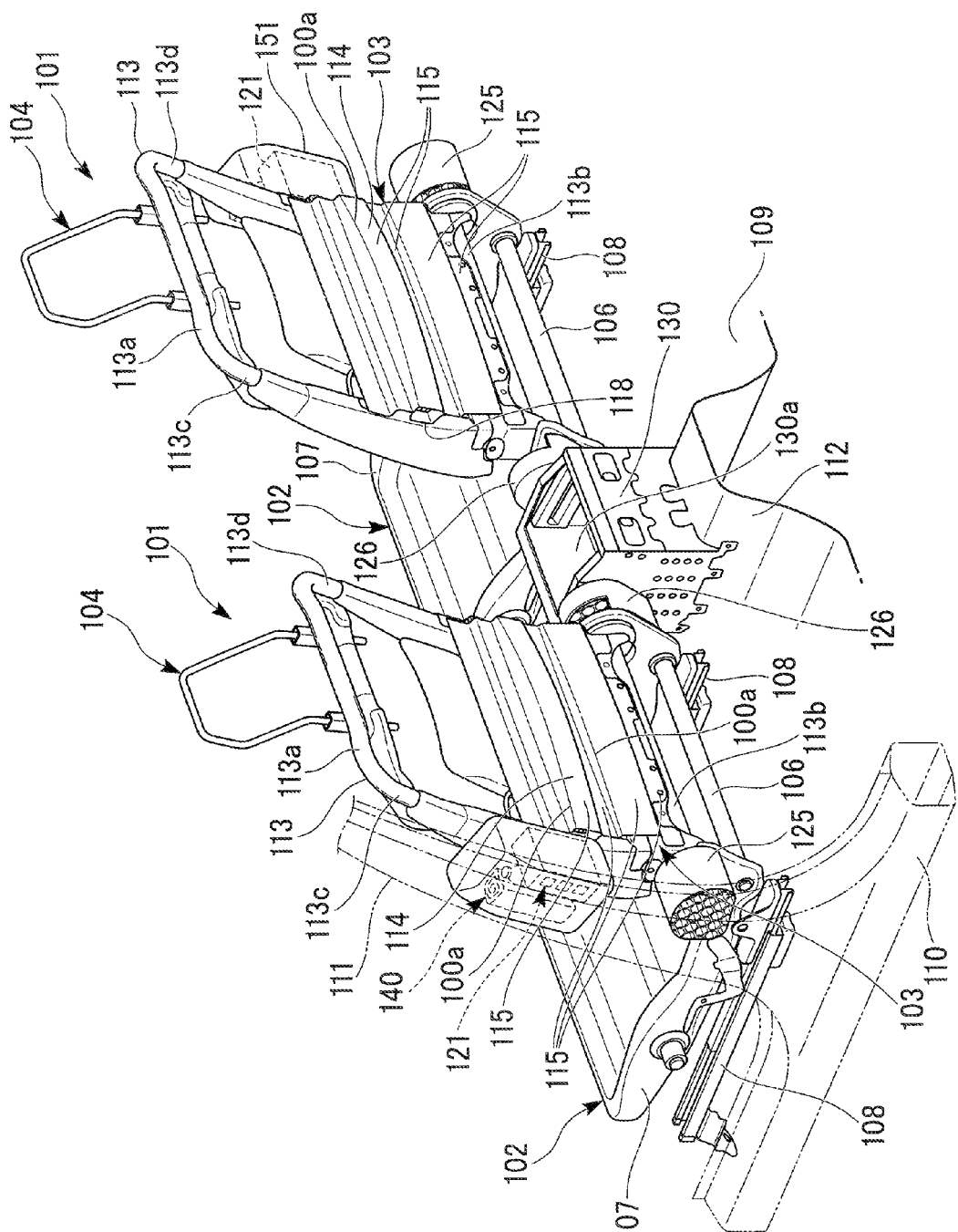
FIG. 4 is a perspective view of a vehicle seat according to a second embodiment of the present invention.
Figure 5:
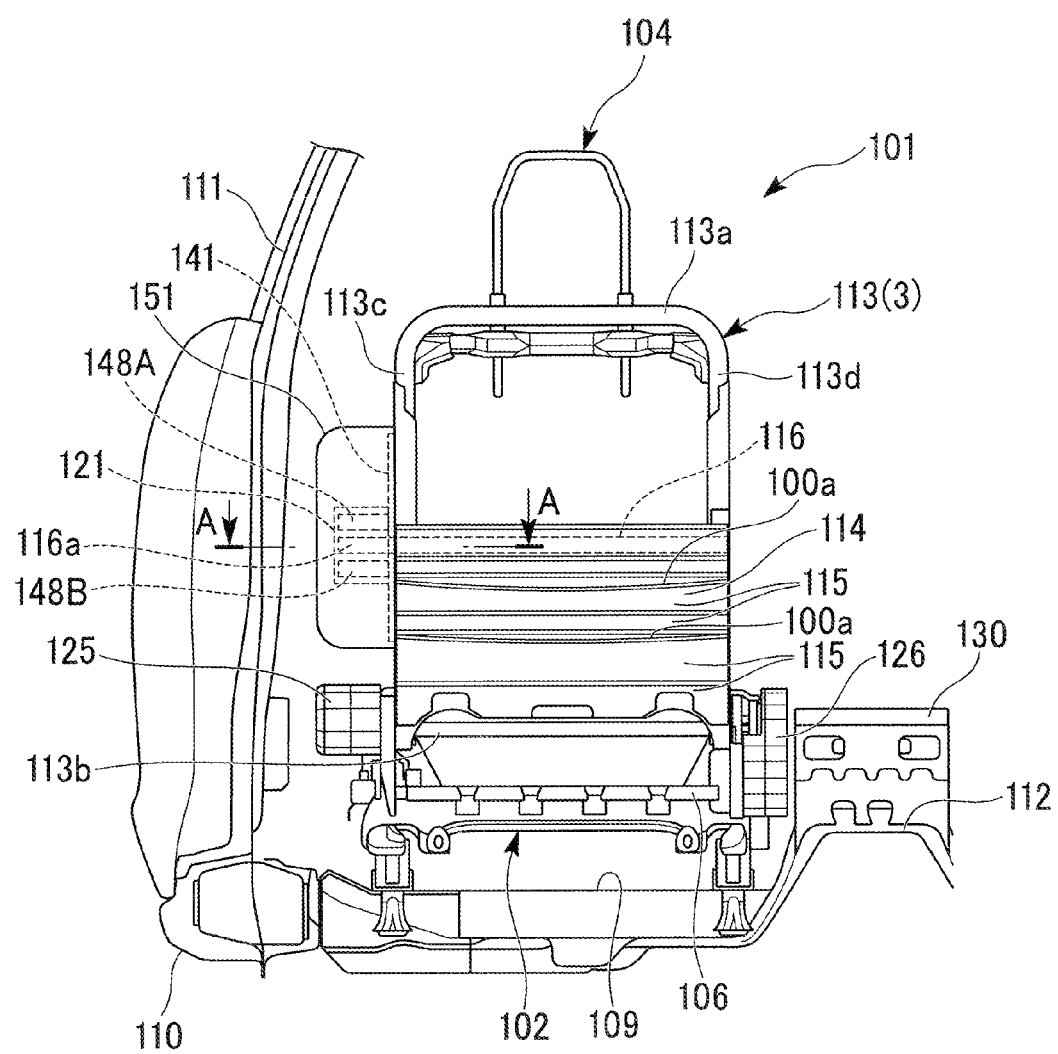
FIG. 5 is a back side view of a vehicle seat according to the above embodiment.

FIGS. 4 and 5 are respectively a perspective view and a back surface view of a vehicle seat 101 according to the present invention. The vehicle seat 101 is placed at a front seat side of the vehicle. FIGS. 4 and 5 are views seen from a diagonally rear side. Incidentally, in the diagram, only a skeletal component of the vehicle seat 101 is shown.

The vehicle seat 101 includes a seat cushion 102 which supports a bottom of a passenger, a seatback 103 which is linked to a rear end part of the seat cushion 102 and supports a hip and a chest (a back) of the passenger, and a head rest 104 which is supported by an upper part of the seatback 103 and supports a head and a neck of the passenger.

The seat cushion 102 includes a cushion frame 107 at a rear end part of the seat cushion 102. A rear part cross member 106 is fastened to the cushion frame. The rear part cross member 106 extends along the vehicle width direction. This cushion frame 107 is provided on a vehicle body floor 109 via a seat rail 108, 108 so that the cushion frame 107 can slide in the front-rear direction. Incidentally, reference numeral 110 in the diagram indicates a side sill provided on a lower end side part of the vehicle body. Reference numeral 111 indicates a center pillar which is provided at approximately a center of a side part of the vehicle body. Reference numeral 112 is a floor tunnel formed so as to expand upwards at a central region in a vehicle width direction on the vehicle body floor 109. A console box 130 is fixed between the left vehicle seat 101 and the right vehicle seat 101 in a front row on the floor tunnel 112. A storage part 130a is provided at an upper surface side of the console box 130.

The seatback 103 includes a seatback frame 113 which is shaped approximately like a rectangular frame. The seatback frame 113 includes an upper frame 113a, a left side frame 113c, a right side frame 113d, and a lower connecting plate 113b. A lower end of the seatback frame 113 is hinge-connected to a rear end part of the cushion frame so that the seatback frame 113 can tilt. A supporting frame of the head rest 104 is provided at a central location in the width direction of the upper part frame 113a of the seatback frame 113, so that the supporting frame of the head rest 104 can be elevated and lowered.

A plate member 114 is provided on a back side of the seatback frame 113. The plate member 114 is approximately rectangular as seen from a frontal view.

The plate member 114 includes a plurality of concave and convex parts 115. A ridge part 100a of the concave and convex parts 115 extends in the vehicle width direction. A wave-shaped cross section, formed by the concave and convex parts 115, extends continuously in the longitudinal direction of the vehicle body. A cross member 116 is fixed to an upper rim part of the plate member 114. The cross member 116 extends in the width direction of the vehicle body. The plate member 114 is supported by both of the side frames 113c, 113d via the cross member 116. The height of the cross member 116 is set to be approximately equal to the height of the chest of the passenger sitting on the vehicle seat.

Figure 6:
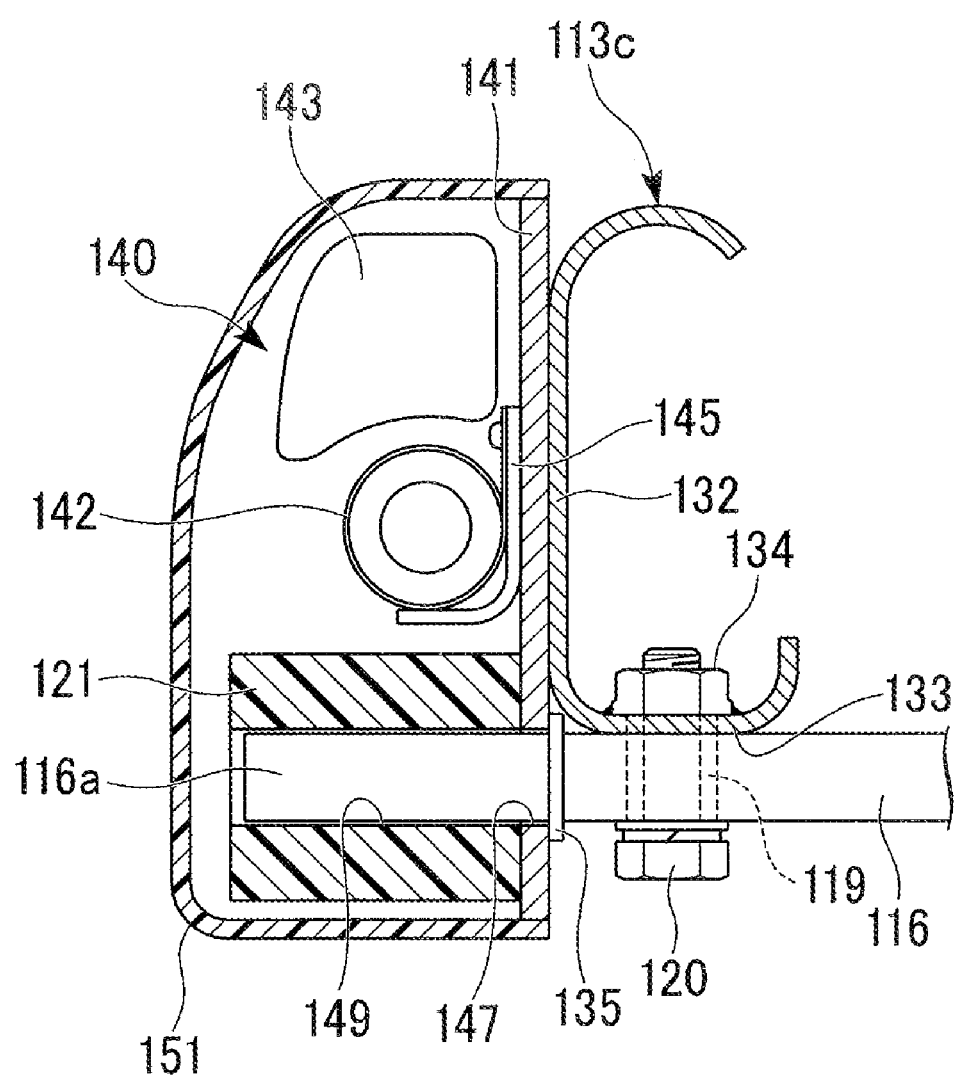
FIG. 6 is a cross sectional view of a vehicle seat according to the above embodiment corresponding to a cross section A-A in FIG. 5.

FIG. 6 shows a cross section near a connection part between the cross member 116 and the side frame 113c at an outer side in the vehicle width direction.

As shown in FIG. 6, the side frame 113c is a component having a cross section which is approximately L-shaped. The side frame 113c includes a side wall 132 and a rear wall 133. The side wall 132 is positioned at an outer side in the vehicle width direction. The rear wall 133 extends from a rear end part of the side wall 132 towards the inner side in the vehicle width direction.

In addition, the end rim of the cross member 116 at an outer side in the vehicle width direction is fixed by a bolt 120 to a rear surface of the rear wall 133 of the side frame 113 via a collar 119. Reference numeral 134 in the diagram shows a weld nut to which the bolt 120 is fastened. This weld nut 134 is provided at the rear wall 132. In addition, the end rim of the cross member 116 at an inner side in the vehicle width direction is similarly fixed to a rear part of the side frame 113d. A visual representation of this feature is omitted in the diagram.

Here, and end part of the cross member 116 at an outer side in the vehicle width direction protrudes further to an outer side in the vehicle width direction compared to the side wall 132 of the side frame 113c, in a condition in which the end part of the cross member 116 is fixed to the side frame 113c. In the following description, an area protruding towards an outer side in the vehicle width direction compared to the side frame 113c of the cross member 116 is referred to as a protruding region 116a. According to the present embodiment, the protruding region 116a is included in the protrusion part. In addition, a latching flange 135 is provided at a position of a root part of the protruding region 116a of the cross member 116. In other words, the latching flange 135 is provided at a position at which the cross member 116 is laterally aligned with the side wall 132 when the cross member 116 is fixed to the side flange 113c.

Incidentally, as shown in FIG. 4 and FIG. 5, a load transmission block 121 and an airbag unit 140 are provided at a side part of the seatback frame 113 at an outer side in the vehicle width direction. The load transmission block transmits an impact load, inputted from a side of the vehicle body, to the seatback frame 113. The airbag unit 140 is used to protect a passenger.

Figure 7:
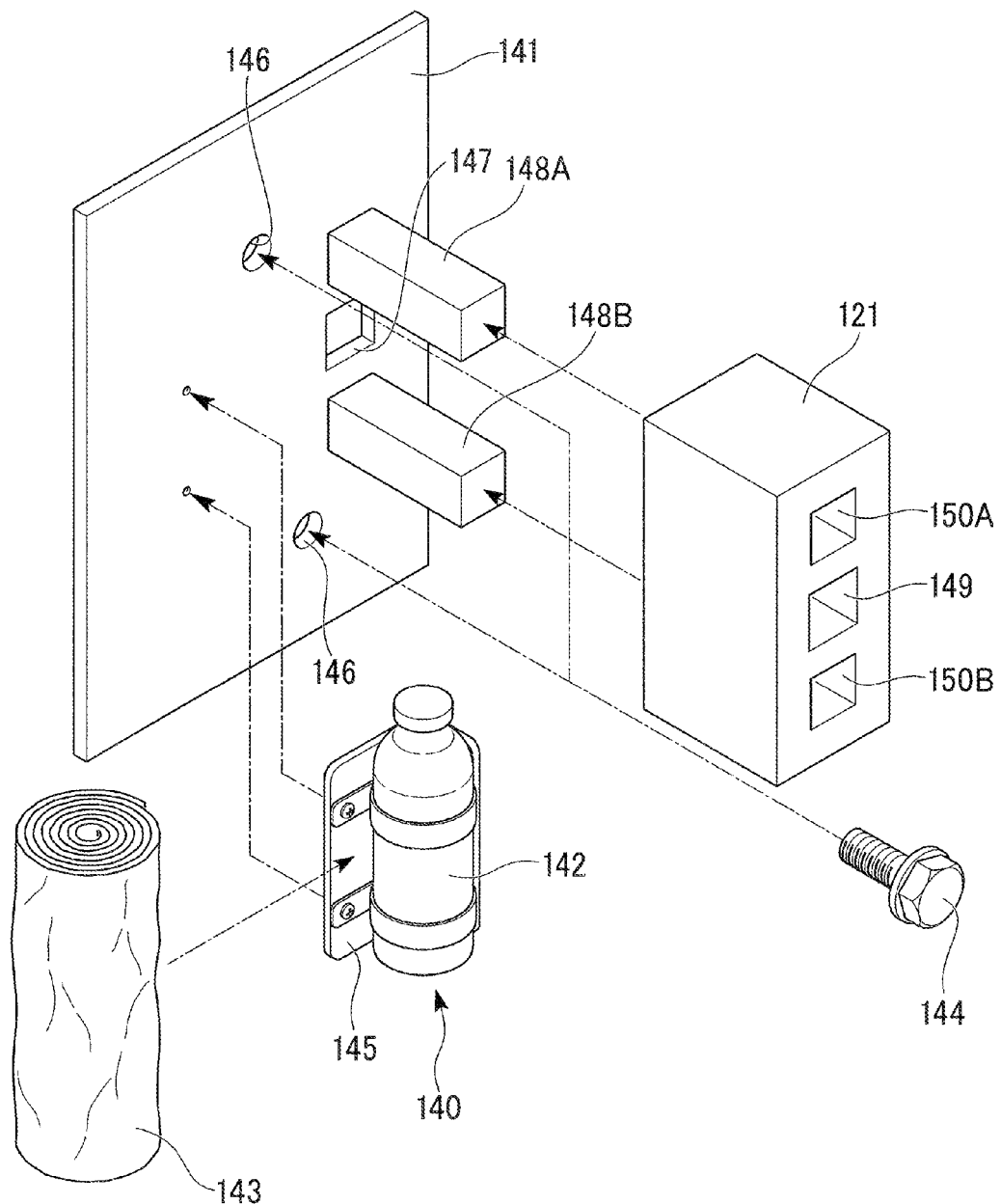
FIG. 7 is a broken down perspective view of a portion of a vehicle seat according to the above embodiment.

FIG. 7 shows the details of the load transmission block 121 and the airbag unit 140. As shown in FIG. 6 and FIG. 7, the load transmission block 121 and the airbag unit 140 are attached to one surface (a surface at the outer side of the vehicle) of a base plate 141 (base member) so that the load transmission block 121 and the airbag unit 140 are aligned in the front-rear direction of the vehicle body. The base plate 141 includes a metal plate which is approximately shaped as a rectangle. The base plate 141 is overlapped with an outer side surface of the side wall 132 of the side frame 113c in the vehicle width direction. The base plate 141 is fastened and fixed to the side frame 113 with a bolt 144 (see FIG. 7).

The airbag unit 140 includes an inflator 142 and a bag body 143. The inflator 142 emits high pressure gas when an impact is detected by a detector which is not diagramed. The bag body 143 is folded up, but deploys by the gas pressure generated by the inflator 142. The bag body 143 is connected to the inflator 142. The inflator 142 is fixed on the base plate 141 via a bracket 145 which is shaped approximately like the letter L.

A bolt insertion hole 146 is formed on the base plate 141. A bolt 144 is inserted in the bolt insertion hole 146. The bolt 144 fixes the base plate 141 to the side frame 113c. At the same time, a penetration hole 147 is formed towards a rear side of the vehicle body compared to the position at which the airbag unit 140 is provided. A protruding region 116a of the cross member 116 is fitted to the penetration hole 147. Further, at the upper and lower positions of the penetration hole 147 on the base plate 141, guiding protrusions 148A, 148B are fixed. The guiding protrusions 148A, 148B are shaped as a rectangular cylinder.

The load transmission block 121 is formed as a honeycomb structure including a plurality of cylindrical parts extending along the vehicle width direction and positioned in parallel. Overall, the load transmission block 121 includes resin, and is shaped as a parallelepiped elongated in the longitudinal direction. Further, a fitting hole 149 is formed on the load transmission block 121. The protruding region 116 of the cross member 116 is fitted and fixed to the fitting hole 149. The protruding region 116 protrudes from the penetration hole 147 of the base plate 141 towards an outer side in the vehicle width direction. Further, fitting holes 150A, 150B are formed on the load transmission block 121. Guiding protrusions 148A, 148B are fitted to the fitting holes 150A, 150B. The guiding protrusions 148A, 148B are provided on the base plate 141.

Figure 8:
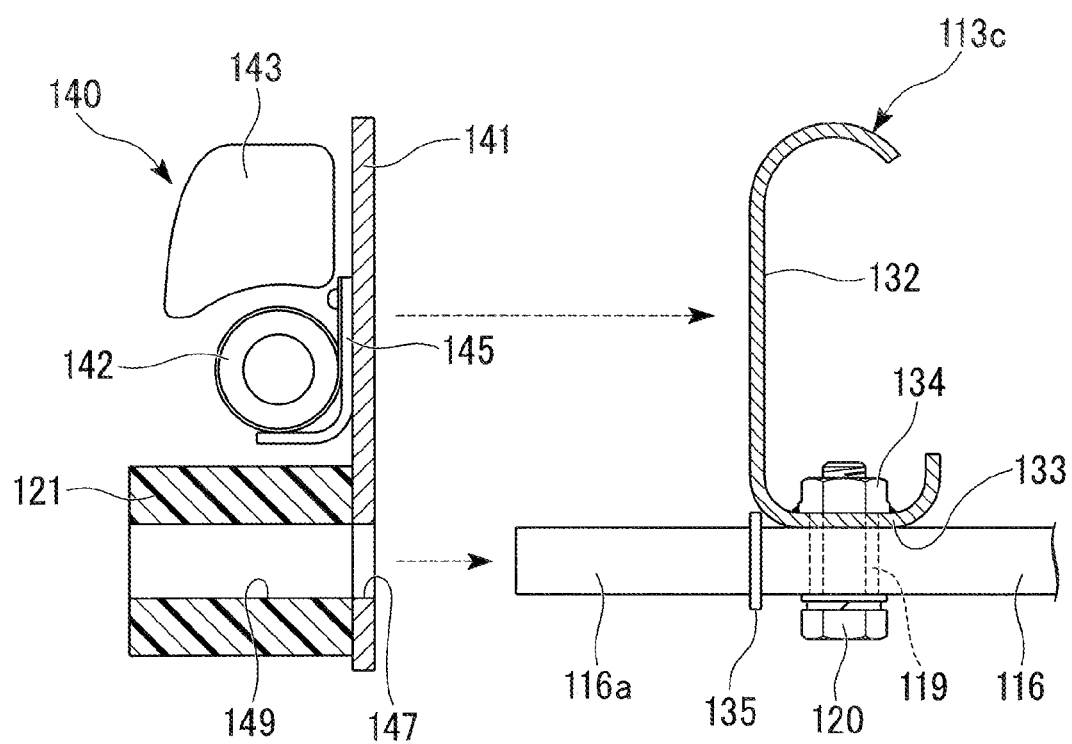
FIG. 8 is a broken down cross sectional view of a vehicle seat according to the above embodiment corresponding to a cross section A-A in FIG. 5.

FIG. 8 shows a procedure of assembling the load transmission block 121 and the airbag unit 140.

As shown in FIG. 8, the load transmission block 121 and the airbag unit 140 are attached to a surface of the base plate 141 in advance. In particular, the airbag unit 140 is fixed to the base plate 141 via the bracket 145. In addition, the load transmission block 121 is fitted and fixed to the guiding protrusions 148A, 148B on the base plate 141.

Next, from this condition, the other surface of the base plate 141 is overlapped with the outer side surface of the side wall 132 of the side frame 113c. At this time, the protruding region 116a of the cross member 116 is fitted to the fitting hole 149 of the load transmission block 121 via the penetration hole 147 of the base plate 141. Thereafter, the base plate 141 is fastened and fixed by the bolt 144 from an outer side in the vehicle width direction.

Incidentally, when the protruding region 116a of the cross member 116 is inserted to a predetermined depth into the penetration hole 147 of the base plate 141, the back surface of the base plate 141 contacts the latching flange 135 of the cross member 116 and the side wall 132 of the side frame 113c. As a result, the displacement of the base plate 141 is restrained. Further, the airbag unit 140 and the load transmission block 121 covered by a common airbag cover 151 after the base plate 141 is fixed to the side frame 113c.

In addition, as shown in FIG. 4 and FIG. 5, the low rim parts of the left and right side frames 113c, 113d are connected to each other by a lower part cross member. The lower part cross member is not diagrammed. The lower part cross member surrounds a hinge axis. The hinge axis connects the seat cushion 102 and the seatback 103 so that the seat cushion 102 and the seatback 103 may be rotated. Further, the load transmission block 125 is provided on a side surface at an outer side of the side frame 113c in the vehicle width direction positioned along an extension of the lower part cross member. The load transmission block 126 is provided on an inner side surface of the side frame 113d in the vehicle width direction.

Similar to the load transmission block 121, each of the load transmission blocks 125, 126 is formed as a honeycomb structure including a plurality of cylindrical parts extending along the vehicle width direction and positioned in parallel. Further, the load transmission block 126 placed toward the side frame 113d faces the side wall of the console box 130 at a central portion in the vehicle width direction.

According to the configuration described above, when an impact load inputted from a side part of the vehicle, and a side wall of the vehicle body such as the center pillar 111 and the like is deformed in the seatback 103 direction, the load from this side wall is transmitted to the side frame 113c via at least one of the upper or lower load transmission blocks 121, 125.

When an impact load is imputed to the lower load transmission block 125, the entire seat moves towards the inner side in the vehicle width direction. At the same time, the load transmission block 126 at a lower part in the inner side in the vehicle width direction contacts the console box 130. At this time, load is transmitted to the floor tunnel 112 from the lower cross member below the seatback frame 113 via the load transmission block 126 and the console box 130.

Further, when an impact load is inputted to the upper load transmission block 121, the load is transmitted to the cross member 116 from the load transmission block 121. In addition, this load is also transmitted edge-on to the side frame 113c via the base plate 141.

An impact load inputted to the cross member 116 along the axis direction is inputted to an upper end part of the plate member 114 connected to the cross member 116. Then, a stress is created in the shear direction at a plurality of regions divided by the ridge part a of each of the concaved and convex parts 115 of the plate member 114. Thus, the impact load which was entered is received by roughly the entire plate member 114. In this way, when an impact load is transmitted via the side plate 113c and the plate member 114 so as to scatter in the entire region of the seatback frame 113, the entire seat moves towards an inner side in the vehicle width direction. At the same time, the load transmission block 126 contacts the console box 130. The load is transmitted to the floor tunnel 112 via the console box 130.

In addition, when an input of an impact is detected and the bag body 143 of the airbag unit 140 is deployed, the deploying reactive force of the bag body 143 is reliably supported by the side frame 113c and the cross member 116 via the approximately L-shaped bracket 145 and the base plate 141.

In this way, according to the vehicle seat based on the present embodiment, the airbag unit 140 and the load transmission block 121 are placed on a common base plate 141. The airbag unit 140 and the load transmission block 121 are aligned in the front-rear direction. In this condition, the base plate 141 is fixed to an outer side surface of the side wall 132 of the side frame 113c. Therefore, at the time of a side collision, an impact load inputted to the load transmission block 121 may be efficiently transmitted edge-on to both the plate member 114 and the side frame 113c. Therefore, the impact load may be received by the entire seatback 103. Furthermore, the load may be transmitted swiftly to the floor tunnel 112.

In addition, according to the vehicle seat 101 based on the present embodiment, the base plate 141 is commonly used to install both the airbag unit 140 and the load transmission block 121. As a result, the number of components may be reduced. Further, the manufacturing cost may be reduced. Moreover, the configuration may be made compact. Since the base plate 141 may be fixed to the side frame 113c with a bolt fastening from an outer side in the vehicle width direction, the assembly operation may be performed easily.

Incidentally, according to the present embodiment, the airbag unit 140 and the load transmission block 121 are installed from a metallic plate to the base plate 141. However, the common base member at which the airbag unit 140 and the load transmission block 121 are installed need not be a planar component. However, as in the present embodiment, when a base plate 141 that is a planar component is used, the base plate 141 will not take up a large amount of space in the seat width direction. Therefore, the side part of the seat may be effectively utilized by, for example, enlarging the cubic capacity of the load transmission block which is superior in absorbing an impact.

Furthermore, according to the present embodiment, a fitting hole 149 is provided on the base plate 141. A protruding region 116a of the cross member 116 is fitted to the fitting hole 149. As a result, at the time of assembly, the load transmission block 121 and the airbag unit 140 may be assembled to the side part of the side frame 113c in an accurate manner by fitting the protruding region 116a of the cross member 116 to the fitting hole 149 of the base plate 141.

Furthermore, according to the present embodiment, a fitting hole 149 is provided on the load transmission block 121. The load transmission block 121 is fitted and fixed by the fitting hole 149 to the protruding region 116a of the cross member 116 protruding from the penetration hole 147. As a result, it is possible to further enhance the efficiency with which the load is transmitted from the load transmission block 121 to the seatback 103.

Hereinafter, a third embodiment of the present invention is described based on FIGS. 9 to 13.

Figure 9:
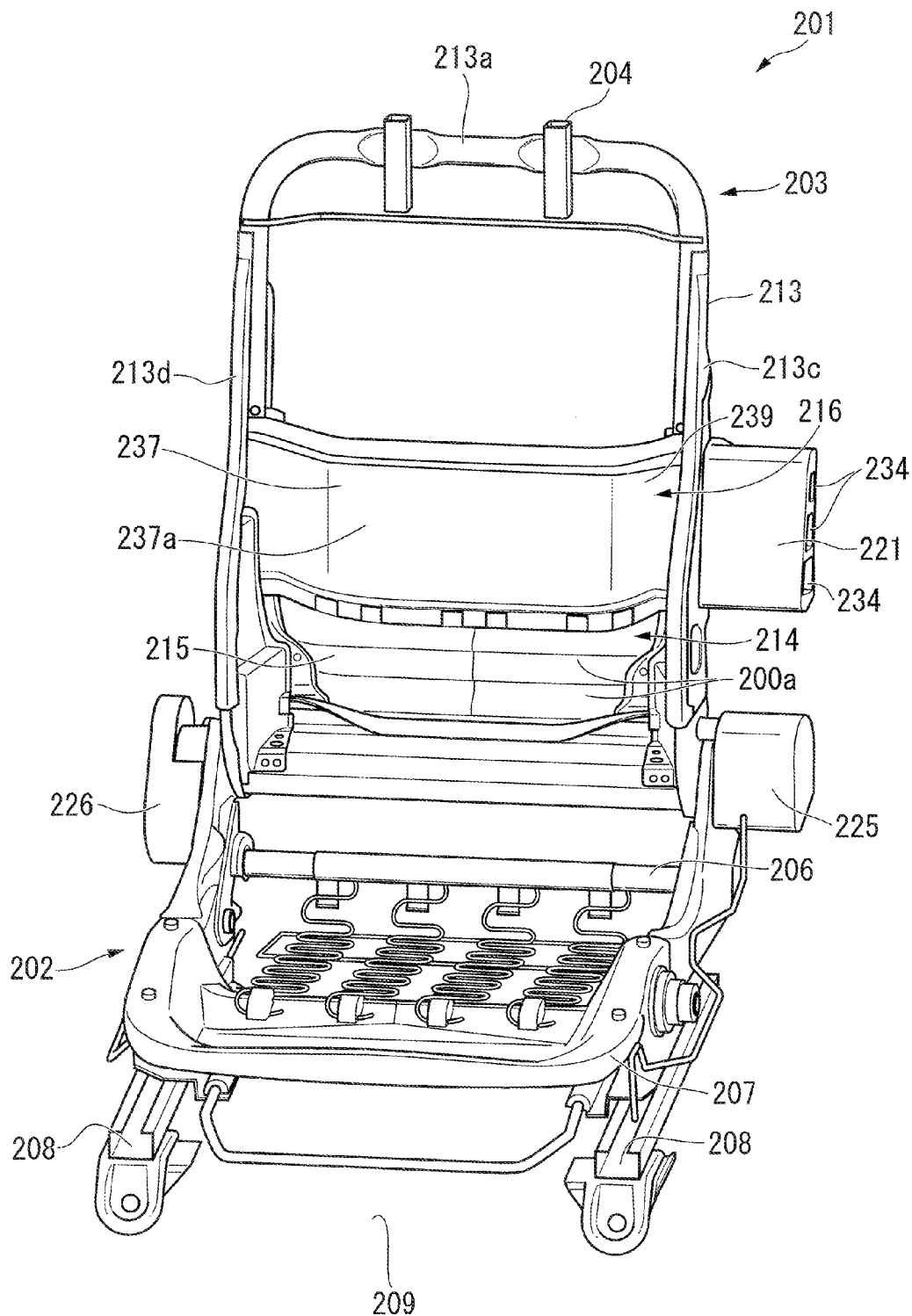
FIG. 9 is a perspective view of a vehicle seat according to a third embodiment of the present invention seen from a diagonally upper direction of a front surface.

FIG. 9 is a perspective view of a vehicle seat 201 placed at a front seat side of a vehicle, seen from a diagonally front side.

The vehicle seat 201 includes a seat cushion 202 which supports a bottom of a passenger, a seatback 203 which is linked to a rear end part of the seat cushion 202 and supports a hip and a chest (a back) of the passenger, and a head rest 204 which is supported by an upper part of the seatback 203 and supports a head and a neck of the passenger.

The seat cushion 202 includes a cushion frame 207 at a rear end part of the seat cushion 202. A rear part cross member 206 is fastened to the cushion frame. The rear part cross member 206 extends along the vehicle width direction. This cushion frame 207 is provided on a vehicle body floor 209 via a seat rail 208, 208 so that the cushion frame 207 can slide in the front-rear direction.

Figure 10:
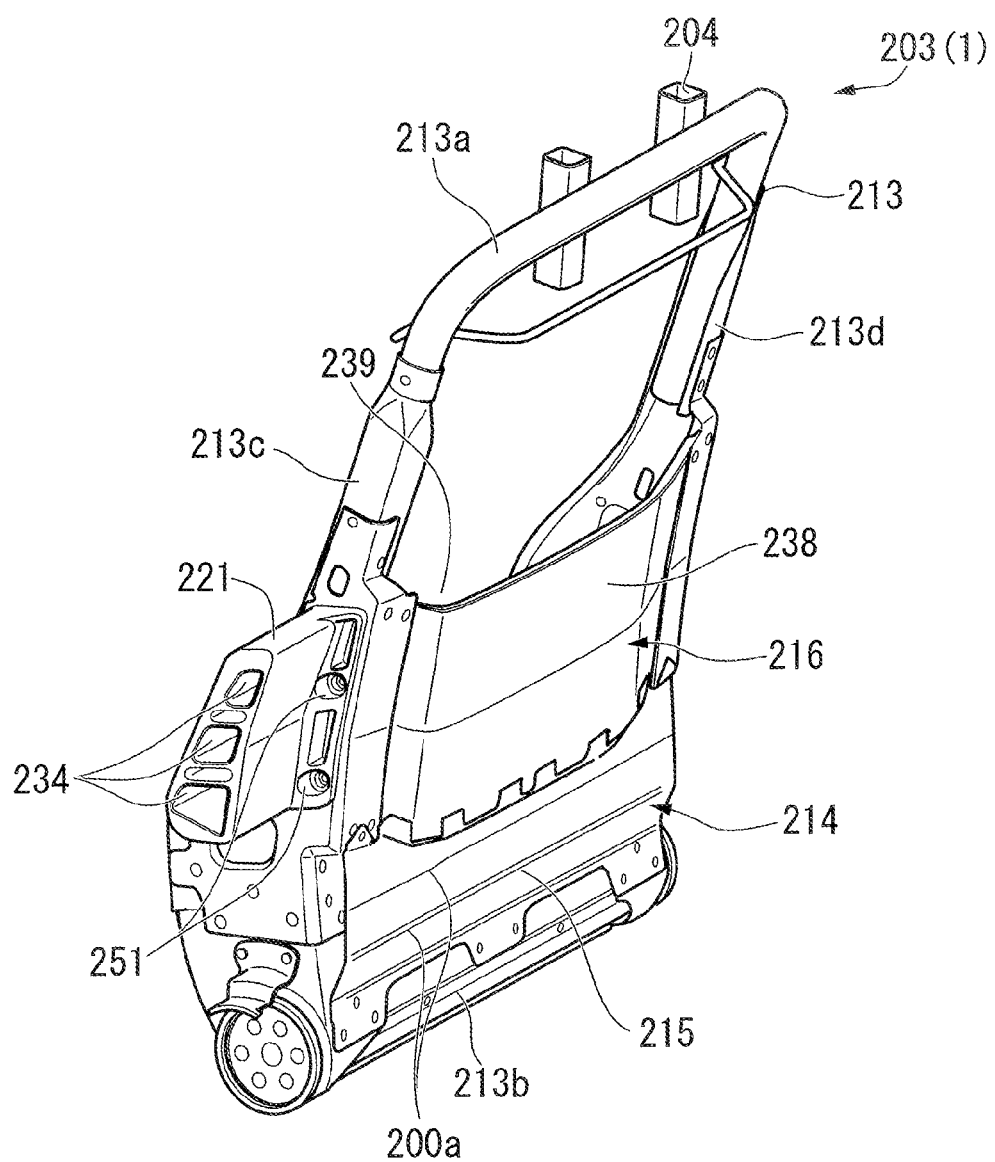
FIG. 10 is a perspective view of a seatback of a vehicle seat according to the above embodiment seen from a diagonally upper direction of a back surface.
Figure 11:
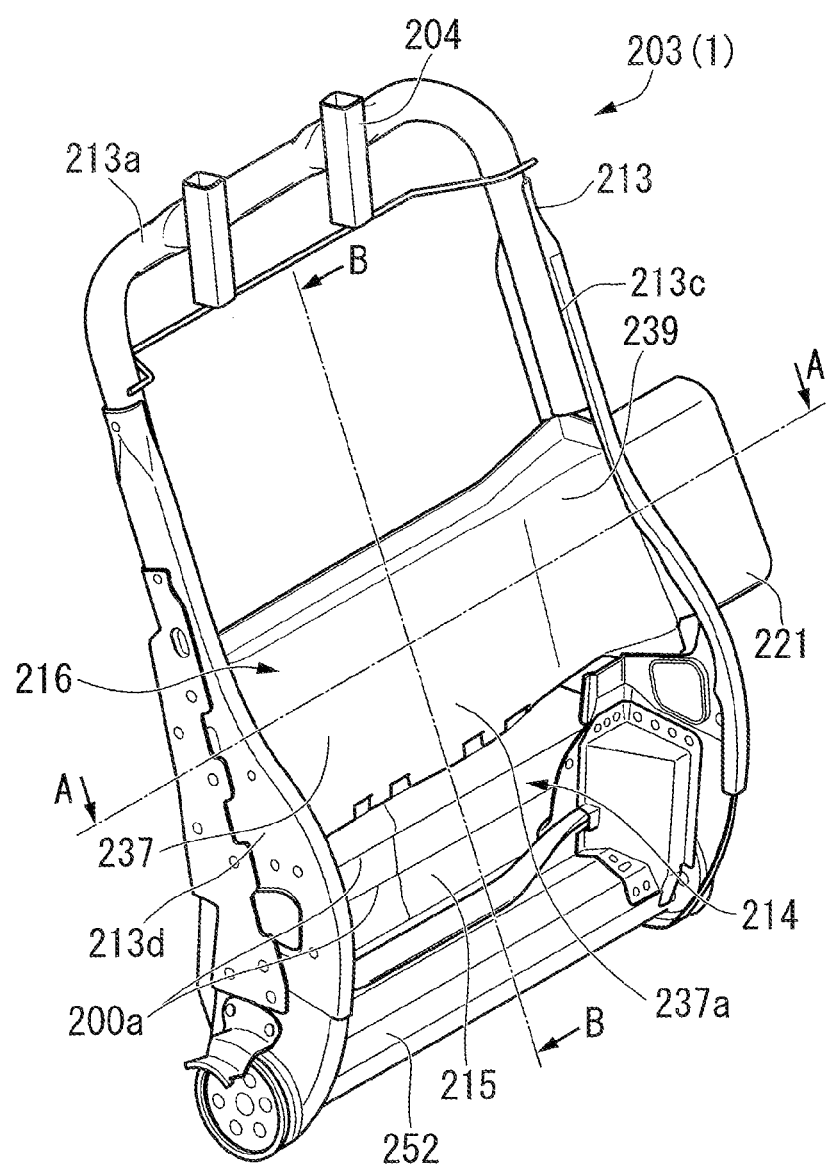
FIG. 11 is a perspective view of a seatback of a vehicle seat according to the above embodiment seen from a diagonally upper direction of a front surface.
Figure 12:
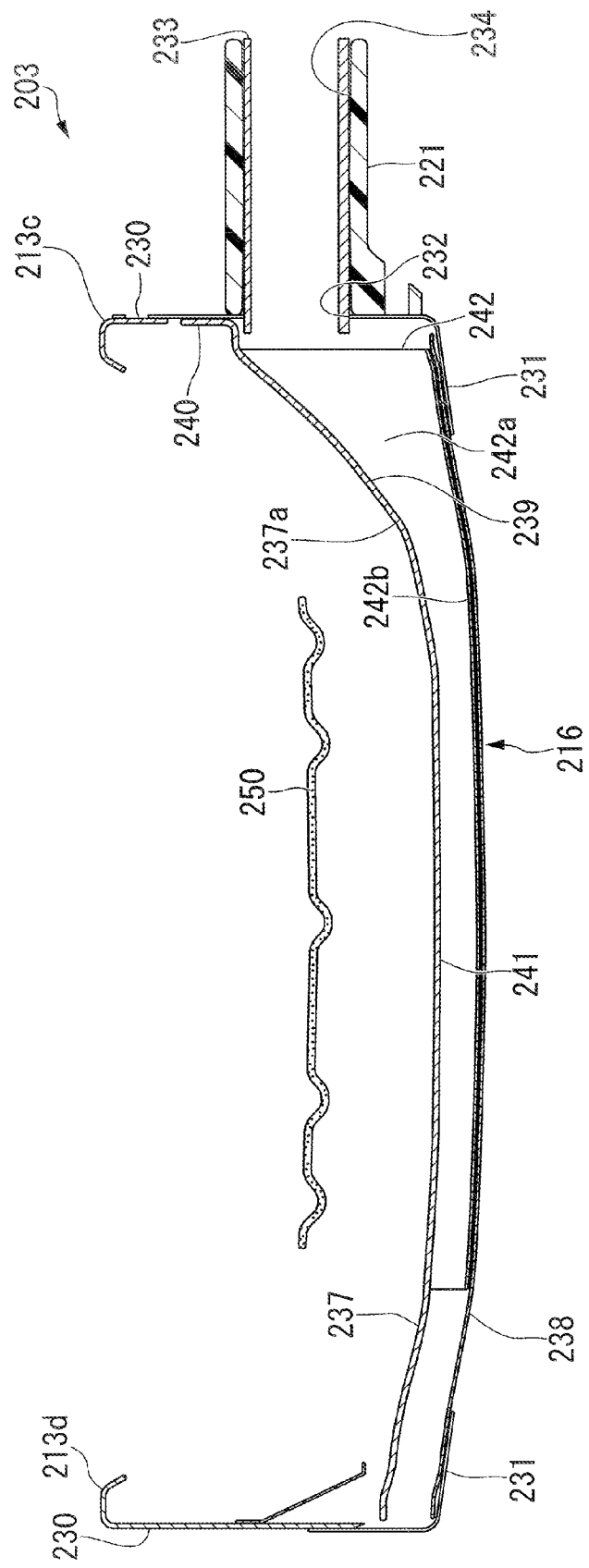
FIG. 12 is a cross sectional view of a vehicle seat according to the above embodiment corresponding to a cross section A-A of FIG. 10.
Figure 13:
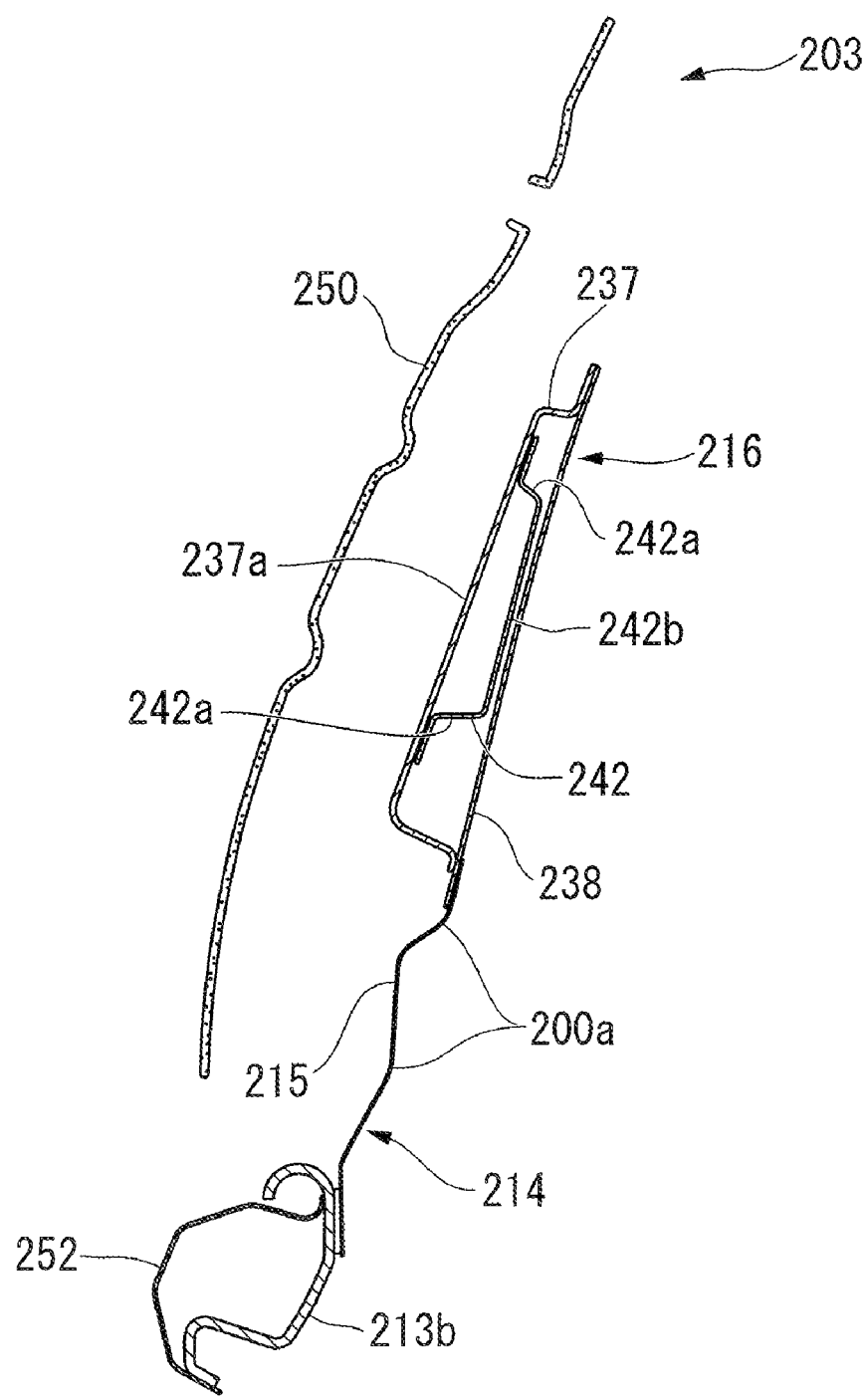
FIG. 13 is a cross sectional view of a vehicle seat according to the above embodiment corresponding to a cross section B-B of FIG. 10.

FIGS. 10, 11 are perspective views of the seatback 203, seen from respectively the frontal side and the rear side. FIGS. 12, 13 are cross sectional diagrams of the seatback 203.

The seatback 203 includes a seatback frame 213 which is shaped approximately like a rectangular frame. The seatback frame 213 includes an upper frame 213a, a left side frame 213c, a right side frame 213d, and a lower connecting plate 213b. A lower end of the seatback frame 213 is hinge-connected to a rear end part of the cushion frame so that the seatback frame 213 can tilt. A supporting frame of the head rest 204 is provided at a central location in the width direction of the upper part frame 213a of the seatback frame 213, so that the supporting frame of the head rest 204 can be elevated and lowered.

A cross member 216 is attached to the left side frame 213c and the right side frame 123d. The cross member 216 connects both of the side frames 213c, 213d at an approximately middle position in the height direction. At the same time, a center stiffener 214 is provided. The center stiffener 214 connects both of the side frames 213c, 213d at a lower side of the cross member 216.

As shown in FIG. 12, the side frames 213c, 213d are components having a cross section which is approximately L-shaped. The side frames 213c, 213d include a side wall 230 and a rear wall 231. The side wall 230 is positioned at an outer side in the vehicle width direction. The rear wall 231 extends from a rear end part of the side wall 230 towards the inner side in the vehicle width direction.

A penetration hole 232 is provided at an approximately center location in the height direction at a side wall 230 of the side frame 213c at an outer side in the width direction. The cylindrical guiding protrusion 233 is fixed by being fitted to the penetration hole 232. The guiding protrusion 233 protrudes from the side wall 230 towards the outer side in the width direction. The load transmission block 221 (outer side load transmission block) is fitted and fixed to the protruding portion. Incidentally, a plurality of guiding protrusions 233 are provided in the upper and lower portions of the side wall 230.

The load transmission block 221 is a component which transmits an impact load, inputted from the side of the vehicle body at the time of a side collision of the vehicle, to the side frame 213c. The load transmission block 221 is formed as a honeycomb structure including a plurality of cylindrical parts extending along the vehicle width direction and positioned in parallel. Overall, the load transmission block 221 includes resin, and is shaped as a parallelepiped elongated in the longitudinal direction. A plurality of fitting holes 234 are formed on the load transmission block 221. A guiding protrusion 233 is fitted to the plurality of fitting holes 234. The guiding protrusion 233 is provided on the side frame 213c. The load transmission block 221 is fastened to the side frame 213c by a bolt from the outer side in the width direction, in a condition in which the fitting hole 234 is fitted to the guiding protrusion 233. This bolt is not diagramed. Incidentally, the reference numeral 251 in the diagram indicates an insertion hole on the load transmission block 221 into which a head portion of the bolt is inserted.

Here, a cross member 216 connects the left and right side frames 213c, 213d at approximately a middle position. The cross member 216 is configured so that the upper portion of the front panel 237 is welded to the upper portion of the rear panel 238. The cross member 216 is also configured so that the lower portion of the front panel 237 is welded to the lower portion of the rear panel 238. The front panel 237 is included in the front wall. The rear panel 238 is included in the rear wall. Due to these panels 237, 238, a structure is formed so that a closed cross section is elongated in the width direction.

The rear panel 238 is formed straight so that the front surface of the rear wall 231 of the left and right side frames 213c, 213d are connected linearly. Meanwhile, the front panel 237 includes a curved part 239. The curved part 239 curves from an end part at the side frame 213c side at an outer side towards a rear side of the seat towards the center in the width direction. A region connecting with this curved part 39 at an inner side in the width direction is formed in an approximately straight manner along the seat width direction. Furthermore, at an end part at a side frame 213c side of the front panel 237, a welding flange 240 is formed. This welding flange 240 is welded to an inner side of the side wall 230 of the side frame 213c. At least a portion of the welding flange 240 of the front panel 237 is welded towards a front side compared to a penetration hole 232 of the side wall 230 of the side frame 213c. An end rim of the rear panel 238 is welded to a front surface of the rear wall 231 of the side frame 213c. In this condition, at least a portion of the region forming a closed cross section at an end part of the front panel 237 at an outer side in the width direction is positioned at a front side of the load transmission block 221. Further, an area forming a closed cross section at an end part of the rear panel 238 at an outer side in the width direction is positioned at a rear side of the load transmission block 221.

Further, the shape of the front wall 237a of the front panel 237 changes so that the curved part 239 crosses the front part of the penetration hole 232 of the side frame 213c, and sinks in at a rear side of the seat. However, at a back surface of the front wall 237a positioned at the inner side of the closed cross section of the cross member 216, the bending part 239 and a reinforcing panel 242 (reinforcing member) are connected so as to bridge a portion of the straight part 241 connected with the curved part 239. The cross section of the reinforcing panel 242 is shaped as a hat. Both leg parts 242a included in the hat-shaped cross section of the reinforcing panel 242 are configured so that the length of the leg parts 242a changes continuously along the curved shape of the curved part 239. Meanwhile, the bottom wall part 242b included in the hat-shaped cross section is formed in a straight manner over the seat width direction. Therefore, the rigidity of the bending part 239 of the front panel 237 in the seat width direction and the strength of the bending part 239 of the front panel 237 is enhanced by the structure of the reinforcing panel 242 welded to the back surface.

Further, an end part of the cross member 216 at an inner side in the width direction is configured so that only an end rim of the rear panel 238 is welded to the front surface of the rear wall 231 of the side frame 213d at an inner side in the width direction. Incidentally, the reference numeral 50 in FIG. 12 and FIG. 13 represents a supporting plate which supports a pad of the seatback 203. The pad is not diagrammed.

Meanwhile, the center stiffener 214 at a lower side of the cross member 216 includes a metallic plate member. The metallic plate member is rectangular seen from a frontal view. The center stiffener 214 includes a plurality of concave and convex parts 215. A ridge part 200a extends in the vehicle width direction. A wave-shaped cross section, formed by the concave and convex parts 215, extends continuously in the longitudinal direction of the vehicle body. The side rim part at both sides of the center stiffener 214 is welded to a back surface of the left and right side frames 213c, 213d. The upper rim part and the lower rim part of the center stiffener 214 are respectively welded to the lower end of the cross member 216 and the upper end of the lower part connection plate 213b.

In addition, as shown in FIG. 9 and FIG. 10, the low rim parts of the left and right side frames 213c, 213d are connected to each other by a lower part cross member 252. The lower part cross member 252 surrounds a hinge axis. The hinge axis connects the seat cushion 202 and the seatback 203 so that the seat cushion 202 and the seatback 203 may be rotated. Further, the load transmission block 225 is provided on a side surface at an outer side of the side frame 213c in the vehicle width direction positioned along an extension of the lower part cross member 252. The load transmission block 226 is provided on an inner side surface of the side frame 213d in the vehicle width direction. Similar to the load transmission block 221, each of the load transmission blocks 225, 226 is formed as a honeycomb structure including a plurality of cylindrical parts extending along the vehicle width direction and positioned in parallel. Further, the load transmission block 226 placed toward the side frame 213d faces the side wall of the console box at a central portion in the vehicle width direction. The console box is not diagrammed.

According to the configuration described above, when an impact load is entered to a side part of the vehicle body at the time of a side collision of the vehicle, and a side wall of the vehicle body such as a center pillar deforms in the direction of the seatback 203, the load from the side wall is transmitted to the side frame 213c via at least one of the upper and lower load transmission blocks 221, 225.

When an impact load is entered to the lower impact transmission block 225, the entire seat moves towards the inner side in the vehicle width direction. At the same time, the impact transmission block 226, provided at the inner lower side in the vehicle width direction, comes in contact with the console box. At this time, the load is transmitted from the lower cross member 252, positioned below the seatback frame 213, to the floor tunnel via the load transmission block 226 and via the console box.

Furthermore, when an impact load is entered to the upper load transmission block 221, the load is transmitted edge-on to the side frame 213c at an outer side of the width direction from the load transmission block 221. Further, this load is transmitted to the side frame 213d at an inner side in the width direction from the side frame 213c via the cross member 216, the center stiffener 214, the upper and lower framework of the seatback frame 213, and the like.

At this time, when an impact load enters from the side frame 213c to the cross member 216, the load is also transmitted from the cross member 216 to an upper end part of the center stiffener 214. In addition, when a load is inputted to the upper end part of the center stiffener 214, a stress is created in the shear direction at a plurality of regions divided by the ridge part 200a of each of the concaved and convex parts 215 of the center stiffener 214. Thus, the impact load which was entered is received by roughly the entire center stiffener 214. This impact load is transmitted to the side frame 213d at an inner side so as to be scattered through the entire area of the center stiffener 214.

When the load is transmitted to the side frame 213d in this way, the entire seat moves towards the inner side in the width direction. At the same time, the load transmission member 226 contacts the console box. At this time, the load is transmitted to the floor tunnel via the console box.

As described above, according to the vehicle seat 201 based on the present embodiment, the load transmission block 221 is fixed to an outer side surface of the side frame 213c at an outer side in the width direction. Further, an end part of the cross member 216 connecting the left and right side frames 213c, 213d is connected to the side frame 213c so that the cross member 216 is positioned to bridge the front side of the load transmission block 221 and the rear side of the load transmission block 221. Therefore, an impact load inputted to the load transmission block 221 at the time of a side collision may be received edge-on by the side frame 213c. At the same time, the load may be applied linearly to a central portion of the closed cross section at an end surface of the cross member 216.

Therefore, according to a vehicle seat 201 based on the present embodiment, based on a synergistic effect, an impact load inputted from the load transmission block 221 may be transmitted to a floor tunnel side quickly and efficiently using the entire region of the seatback 203.

Further, according to the vehicle seat 201 based on the present embodiment, the curved part 239 is provided to the front panel 237 of the cross member 216 so as to sink from the outer side in the width direction towards a center side. Therefore, the curved part 239 may receive the back part of a seated passenger. As a result, the comfort level of the passenger may be enhanced.

Further, an end part of the cross member 216 at an outer side in the width direction is bulging forward compared to the penetration hole 232 (an installation portion of the load transmission block 221) of the side frame 213c. The cross member 216 is placed so that the entire cross member 216 fits within the width of the side frame 13c in the front-rear direction. Therefore, it is possible to increase the efficiency with which the load is transmitted at the time of a side collision. Further, the seatback 203 may be made thinner.

Further, according to a vehicle seat 201 based on the present embodiment, a reinforcing panel 242 is provided inside the closed cross section of the cross member 216. The reinforcing panel 242 reinforces the curved part 239. The cross section of the reinforcing panel 242 is shaped like a hat. Therefore, the rigidity of the curved part 239 and the strength of the curved part 239 may be enhanced with reliability, without reducing the visual appeal of the cross member 216.

Further, according to a vehicle seat 201 based on the present embodiment, the load transmission block 221 is provided at the side frame 213c, so that the load transmission block 221 is positioned toward the front side compared to the side frames 213c, 213d, and the back surface of the cross member 216. Therefore, it is possible to enlarge the space round the knees of the passenger seated on the rear seat. In this way, it is possible to enhance the comfort level of a passenger in the rear seat.

Furthermore, according to the vehicle seat 201 based on the above embodiment, an end part of the cross member 216 at an outer side in the width direction contacts the inner surface of the side wall 230 of the side frame 213c. Further, the cross member 216 is welded to the side wall 230 with a welding flange 240. Therefore, at the time of a side collision, a load imputed to the side flange 213c may be transmitted to the cross member 216 more efficiently.

Further, according to a vehicle seat 201 based on the present embodiment, the center stiffener 214 includes concaved and convex parts 215 such that the ridge line 200a extends in the width direction. This center stiffener 214 is welded to the lower end of the cross member 216. As a result, at the time of a side collision, the impact load inputted to the cross member 216 may be quickly transmitted to the lower end of the side frame 213d via the center stiffener 214.

Figure 14:
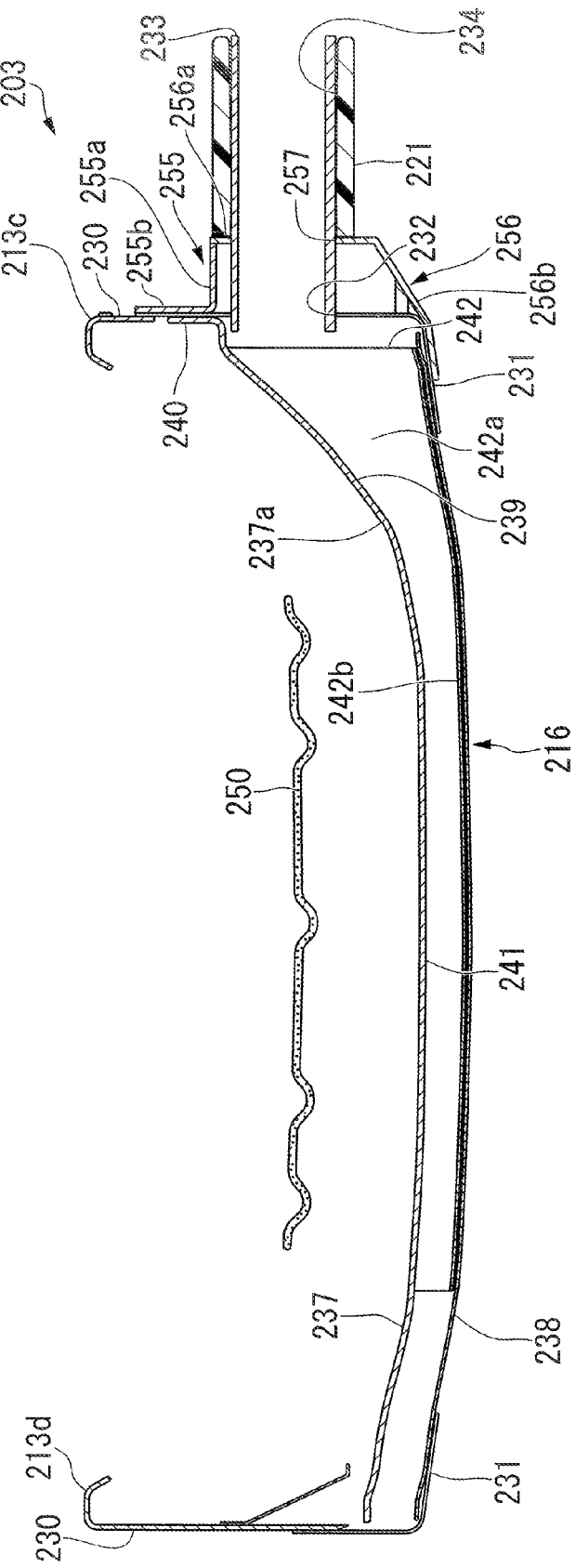
FIG. 14 is a cross sectional view of a vehicle seat according to a fourth embodiment of the present invention corresponding to FIG. 12.

FIG. 14 shows a fourth embodiment of the present invention. Hereinafter, this other embodiment is described. The same components as the third embodiment are referred to using the same reference numerals. Overlapping descriptions are omitted.

The basic configuration of the vehicle seat according to the fourth embodiment is generally similar to the configuration of the third embodiment described above. However, the fourth embodiment differs from the third embodiment in that a reinforcing structure is added to the side frame 213c at an outer side in the vehicle width direction. The reinforcing structure reliably receives an impact load inputted from the load transmission block 221.

This added reinforcing structure includes a front part reinforcing plate 255 and a rear part reinforcing plate 256. The front part reinforcing plate 255 is included in the front wall 255a at the outer side of the side frame 213c. The rear part reinforcing plate 256 is included in the side wall 256a and the rear wall 256b at an outer side of the side frame 213c.

The front reinforcing plate 255 is structured so that a welding flange 255b is provided on an end of the front wall 255a. The welding flange 255b is bent approximately as a shape of the letter L. The welding flange 255b is welded to the side wall 230 of the of the side frame 213c at a front side of the guiding protrusion 233.

The rear part reinforcing plate 256 is configured so that a front end part of the side wall 256a is connected to another end of the front part reinforcing plate 255. At the same time, a fitting hole 257 is formed at a central part of the side wall 256a. The guiding protrusion 233 is fitted to the fitting hole 257. At an outer side surface of the side wall 256a, the load transmission block 221 is fixed so that the load transmission block 221 contacts the outer side surface of the side wall 256a. Further, the rear wall 256b of the rear part reinforcing plate 256 curves gradually from a rear end part of the side wall 256a towards an inner side in the vehicle width direction. A rim part of the tip side is welded to a rear surface of the rear wall 231 of the side frame 213c.

Further, according to the present embodiment, the axial length of the load transmission block 221 is formed to be shorter by the protruding height of the front part reinforcing plate 255 and the rear part reinforcing plate 256. The distance from the side frame 213c to the outer side end surface of the load transmission block 221 is similar to the third embodiment.

The front part reinforcing plate 255 transmits a load, inputted from the load transmission block 221 at the time of a side collision, in a linear manner to the side wall 230 of the side frame 213c via the front wall 255a at a frontal side of the guiding protrusion 233.

Further, the rear part reinforcing plate 256 transmits a load, inputted from the load transmission block 221 at the time of a side collision, in a linear manner to the rear wall 231 of the side frame 213c via the side wall 256a and the rear wall 256b. At this time, the rear wall 256b of the rear part reinforcing plate 255 is welded to the rear wall 231 of the side frame 213c by curving gradually. As a result, the load inputted from the load transmission block 221 is transmitted in approximately a linear manner to the rear panel 238 of the cross member 216 and the rear wall 231 of the side frame 213c along the curve of the rear wall 256b.

Therefore, according to the present embodiment, the load, inputted from the load transmission block 221 at the time of a side collision, may be scattered to the front and rear parts of the guiding protrusion 233 by the front part reinforcing plate 255 and the rear part reinforcing plate 256. Further, the load may be more reliably transmitted to a center portion of the cross section of the cross member 216. Therefore, the load may be scattered and supported in an efficient manner by the left and right side frames 213c, 213d.

Further, according to the present embodiment, the front part reinforcing plate 255 and the rear part reinforcing plate 256 make up the closed cross section at a side part of the side frame 213c. Therefore, it is possible to enhance the rigidity of the side frame 213 itself.

Further, according to the present embodiment, a fitting hole 257 is provided at a side wall 256a of the rear part reinforcing plate 256. Further, the guiding protrusion 233 is supported by the fitting hole 257 portion at a position such that the guiding protrusion 233 is distanced from the side frame 213c. Therefore, the guiding protrusion 233 may be prevented reliably from collapsing.

Incidentally, the present invention is not limited by the present embodiment. Alterations may be made as appropriate within the gist of the present invention.

INDUSTRIAL APPLICABILITY

According to a vehicle seat based on the present invention, a fitting hole of an outer side load transmission block is fitted to a protrusion part provided at a side surface of a side frame at an outer side in the width direction. In this condition, the outer side load transmission block is fixed to the side frame.

Therefore, at the time of a side collision, the impact load, inputted to the outer side load transmission block, may be received edge-on by the side frame at an outer side in the width direction. Furthermore, the efficiency with which the load is transmitted from a side of a vehicle body to a seatback frame may be enhanced.

DESCRIPTION OF REFERENCE NUMERALS

1 Vehicle Seat
13 Seatback Frame
21 Load Transmission Block (Outer Side Weight Transmission Block)
32 Side Wall
33 Rear Wall
35a Outer Side Protrusion Part (Protrusion Part)
41 Reinforcing Member
48 Fitting Hole
101 Vehicle Seat
103 Seatback
113 Seatback Frame
116a Protruding Region (Protrusion Part)
121 Load Transmission Block (Outer Side Weight Transmission Block)
140 Airbag Unit
141 Base Plate (Base Member)
147 Penetration Hole
149 Fitting Hole
201 Vehicle Seat
213 Seatback Frame
213c Side Frame At An Outer Side In The Width Direction
216 Cross Member
221 Load Transmission Block (Outer Side Weight Transmission Block)
237 Front Panel
238 Rear Panel
239 Curved Part
242 Reinforcing Panel (Reinforcing Member)

The invention claimed is:

1. A vehicle seat comprising:
a seatback frame comprising an outer side part frame, provided at an outer side in a width direction of a vehicle body, and an inner side part frame, provided at an inner side in the width direction;
an outer side load transmission block protruding from the seatback frame towards an outer side in the width direction, and transmitting to the seatback frame, an impact load inputted from a side of the vehicle body; and
a reinforcing member connecting a left side part frame of the seatback frame and a right side part frame of the seatback frame, wherein
among the left side part frame and the right side part frame, a side part frame at an outer side in a vehicle width direction comprises a side wall, facing an outer side in a vehicle width direction, and
also comprises a rear wall extending from a rear end part of the side wall towards an inner side in a vehicle width direction,
a frame member is provided, the frame member being directly fixed to either the rear wall or the side wall, the frame member also extending along a vehicle width direction:
the frame member comprises an outer side protruding part protruding from the side wall towards an outer side in a vehicle width direction, and an inner side protruding part protruding from the side wall towards an inner side in a vehicle width direction; and
the outer side protruding part of the frame member is fitted and fixed to a fitting hole provided on the outer side load transmission block.

2. The vehicle seat according to claim 1, wherein:
the reinforcing member comprises a closed cross sectional structure wherein an upper part of a front panel and a lower part of the front panel are connected, to an upper part of a rear panel and a lower part of the rear panel respectively, and the reinforcing member extends in a width direction;
the front panel is connected at a front side position compared to the frame member of the side wall of a side part frame at an outer side in a vehicle width direction; and
the rear panel is connected to the rear wall of a side part frame at an outer side in a vehicle width direction and to a side part frame at an inner side in a vehicle width direction.

3. The vehicle seat according to claim 1, further comprising:
an airbag unit receiving a gaseous pressure of an inflator and deploying a bag body from an end part of an outer side in a width direction of a seatback when an impact is occurred, wherein
the outer side load transmission block and the airbag unit are installed on a surface at an outer side in a vehicle width direction of a base plate, the base plate being planar, and the surface at an inner side in a vehicle width direction of the base plate is overlapped with an outer side surface of the side wall.

4. The vehicle seat according to claim 3, wherein:
the inflator is placed at an outer side in a vehicle width direction of the side wall, and a front side of the outer side load transmission block.

5. The vehicle seat according to claim 1, wherein:
a penetration hole, penetrating in a vehicle width direction, is provided on the side wall; and
the frame member is provided at a front side of the rear wall, and the frame member is fixed to the side wall in a condition of being fitted to the penetration hole.

6. The vehicle seat according to claim 5, wherein:
the inner side protruding part is connected to a rear wall of the side part frame and to the reinforcing member at a position distanced from the side wall towards an inner side in a vehicle width direction.

7. The vehicle seat according to claim 1, wherein: the outer side load transmission block is provided so as to contact an outer side surface of the side wall.

8. The vehicle seat according to claim 1, wherein: the outer side load transmission block is provided on a surface of a base plate at an outer side in a vehicle width direction, the base plate being planar, and a surface of the base plate at an inner side in a vehicle width direction overlaps with an outer side surface of the side wall.

9. The vehicle seat according to claim 1, wherein: the inner side protruding part is fastened from a rear side of the rear wall.

* * * * *